(12) United States Patent
Williams et al.

(10) Patent No.: US 11,615,434 B2
(45) Date of Patent: *Mar. 28, 2023

(54) PROMOTION PLANNING FOR MANAGING ALLOCATION OF INVENTORY MIX UTILIZING AN OPTIMIZATION FRAMEWORK

(71) Applicant: Turner Broadcasting System, Inc., Atlanta, GA (US)

(72) Inventors: Peter Alexander Williams, Atlanta, GA (US); José Antonio Carbajal Orozco, Atlanta, GA (US); Wassim Samir Chaar, Coppell, TX (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/850,376

(22) Filed: Jun. 27, 2022

(65) Prior Publication Data

US 2022/0335465 A1    Oct. 20, 2022

Related U.S. Application Data

(63) Continuation of application No. 15/621,151, filed on Jun. 13, 2017, now Pat. No. 11,423,431.

(51) Int. Cl.
*G06Q 30/00* (2012.01)
*G06Q 30/0207* (2023.01)
*G06Q 30/0204* (2023.01)

(52) U.S. Cl.
CPC ..... *G06Q 30/0223* (2013.01); *G06Q 30/0204* (2013.01); *G06Q 30/0224* (2013.01)

(58) Field of Classification Search
None
See application file for complete search history.

(56) References Cited

U.S. PATENT DOCUMENTS 7,873,541 B1 *   1/2011   Klar ................ G06Q 20/201
                                              705/14.1
8,544,036 B2    9/2013   Bollapragada et al.
                              (Continued)

FOREIGN PATENT DOCUMENTS

WO         0051335 A2    8/2000
WO     WO-0051335 A2 *   8/2000    ............. G06Q 30/04
                              (Continued)

OTHER PUBLICATIONS

Bollapragada, Srinivas, et al. "NBC-Universal uses a novel qualitative forecasting technique to predict advertising demand." Interfaces 38.2 (2008): 103-111. (Year: 2008).*

(Continued)

*Primary Examiner* — Michael Bekerman
(74) *Attorney, Agent, or Firm* — Chip Law Group

(57) ABSTRACT

A media management system that generates a plurality of values associated with a promotion impact measure for each of the promotional campaigns based on historical data that is acquired and an expected audience. Inventory unit needs are determined for each of the promotional campaigns that corresponds to a promotion inventory utilization of a plurality of inventory utilization types, based on at least the generated plurality of values. The determined inventory units for each of the promotional campaigns are utilized to dynamically allocate inventory from a defined amount of inventory units among each inventory utilization types to meet a plurality of defined parameters for the defined amount of inventory units for one or more specified durations until an end of the upcoming time-frame.

20 Claims, 11 Drawing Sheets

(56) References Cited

U.S. PATENT DOCUMENTS

| | | | |
|---|---|---|---|
| 9,652,510 B1* | 5/2017 | Huang | G06F 16/24578 |
| 9,668,002 B1 | 5/2017 | Baron et al. | |
| 10,219,048 B2 | 2/2019 | Kunisetty et al. | |
| 10,299,008 B1 | 5/2019 | Catalano et al. | |
| 11,216,828 B2* | 1/2022 | Littlejohn | H04N 21/2665 |
| 2005/0171897 A1 | 8/2005 | Forsythe et al. | |
| 2006/0253323 A1* | 11/2006 | Phan | G06Q 30/0275 |
| | | | 705/14.66 |
| 2007/0083885 A1* | 4/2007 | Harding | G06Q 30/02 |
| | | | 725/35 |
| 2008/0189734 A1 | 8/2008 | Schepers et al. | |
| 2009/0006145 A1 | 1/2009 | Duggal et al. | |
| 2009/0144168 A1* | 6/2009 | Grouf | G06Q 30/0243 |
| | | | 705/28 |
| 2011/0093343 A1 | 4/2011 | Hatami-Hanza | |
| 2013/0097629 A1 | 4/2013 | Popescu et al. | |
| 2013/0151340 A1 | 6/2013 | Barbieri et al. | |
| 2013/0219427 A1* | 8/2013 | Zundel | H04N 21/23424 |
| | | | 725/32 |
| 2015/0039395 A1* | 2/2015 | Denslow, III | G06Q 30/00 |
| | | | 705/7.35 |
| 2015/0269632 A1 | 9/2015 | Ledwich et al. | |
| 2015/0319510 A1 | 11/2015 | Dellahy et al. | |
| 2015/0348091 A1* | 12/2015 | Haberman | G06Q 30/0244 |
| | | | 705/14.43 |
| 2015/0373387 A1* | 12/2015 | Chaar | H04N 21/2547 |
| | | | 725/35 |
| 2016/0037197 A1* | 2/2016 | Kitts | H04N 21/23424 |
| | | | 725/35 |
| 2016/0246765 A1 | 8/2016 | Hundemer | |
| 2017/0213469 A1 | 7/2017 | Elchik et al. | |
| 2017/0289600 A1* | 10/2017 | Carbajal Orozco | |
| | | | G06Q 30/0276 |
| 2020/0004743 A1* | 1/2020 | Huang | G06F 16/24578 |

FOREIGN PATENT DOCUMENTS

| | | | | |
|---|---|---|---|---|
| WO | 2006097826 A2 | 9/2006 | | |
| WO | WO-2006097826 A2 * | 9/2006 | ......... | G06Q 30/0255 |
| WO | 2013055982 A2 | 4/2013 | | |
| WO | WO-2013055982 A2 * | 4/2013 | ....... | H04N 21/23424 |

OTHER PUBLICATIONS

Araman, Victor F., and Ioana Popescu. "Media revenue management with audience uncertainty: Balancing upfront and spot market sales." Manufacturing & Service Operations Management 12.2 (2010): 190-212. (Year: 2010).*

Non-Final Office Action for U.S. Appl. No. 17/340,149 dated Sep. 26, 2022.

Araman, Victor F. and Ioana Popescu, "Media revenue management with audience uncertainty: Balancing upfront and spot market sales," Manufacuring & Service Operations Management 12.2 (2010): 190-212, (Year: 2010).

Bollapragada et al., "NBC-Universal uses a novel qualitative forecasting technique to predict advertising demand," Interfaces 38.2 (2008): 103-111.

Non-Final Office Action for U.S. Appl. No. 16/895,304 dated Oct. 26, 2022.

Notice of Allowance for U.S. Appl. No. 17/678,700 dated Oct. 13, 2022.

Corrected Notice of Allowance for U.S. Appl. No. 17/678,700 dated Jan. 19, 2023.

Notice of Allowance for U.S. Appl. No. 16/895,304 dated Feb. 16, 2023.

Notice of Allowance for U.S. Appl. No. 17/340,149 dated Jan. 24, 2023.

* cited by examiner

PROMOTION PLANNING FOR MANAGING ALLOCATION OF INVENTORY MIX UTILIZING AN OPTIMIZATION FRAMEWORK

CROSS-REFERENCE TO RELATED APPLICATIONS/INCORPORATION BY REFERENCE

This patent application makes reference to, claims priority to, claims the benefit of, and is a Continuation Application of U.S. patent application Ser. No. 15/621,151, filed on Jun. 13, 2017, the entire content of which is hereby incorporated herein by reference.

This application makes reference to:
U.S. Pat. No. 11,282,115, which is filed concurrently herewith;
U.S. Pat. No. 9,922,341, which was issued on Mar. 20, 2018;
U.S. Pat. No. 11,343,555, which was issued on May 24, 2022;
U.S. Pat. No. 11,093,968, which was issued on Aug. 17, 2021;
U.S. Pat. No. 10,070,166, which was issued on Sep. 5, 2018; and
U.S. Pat. No. 11,064,234, which was issued on Jul. 13, 2021.

Each of the above referenced patent applications is hereby incorporated herein by reference in its entirety.

FIELD OF TECHNOLOGY

Certain embodiments of the disclosure relate to advertising and broadcast systems. More specifically, certain embodiments of the disclosure relate to a method and system for promotion planning for managing allocation of inventory mix utilizing an optimization framework.

BACKGROUND

Most broadcasting and cable networks in the United States are advertisement-based. As such, their business and operations is the delivery of impressions or audiences to advertisers and monitoring campaigns. A network provider (network operator) usually decides what shows to air in the upcoming broadcast year and when to air them. A programming schedule defines an aggregate capacity of non-programming airtime, which usually translates to total inventory units available for different inventory utilization types, such as upfront and scatter spots, promos, filler spots, and so on. It is a challenge to balance the mix of the total inventory units for the different inventory utilization types, where each of the different inventory utilization types consume certain amount of inventory.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for promotion planning for management of allocation of inventory mix utilizing an optimization framework, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
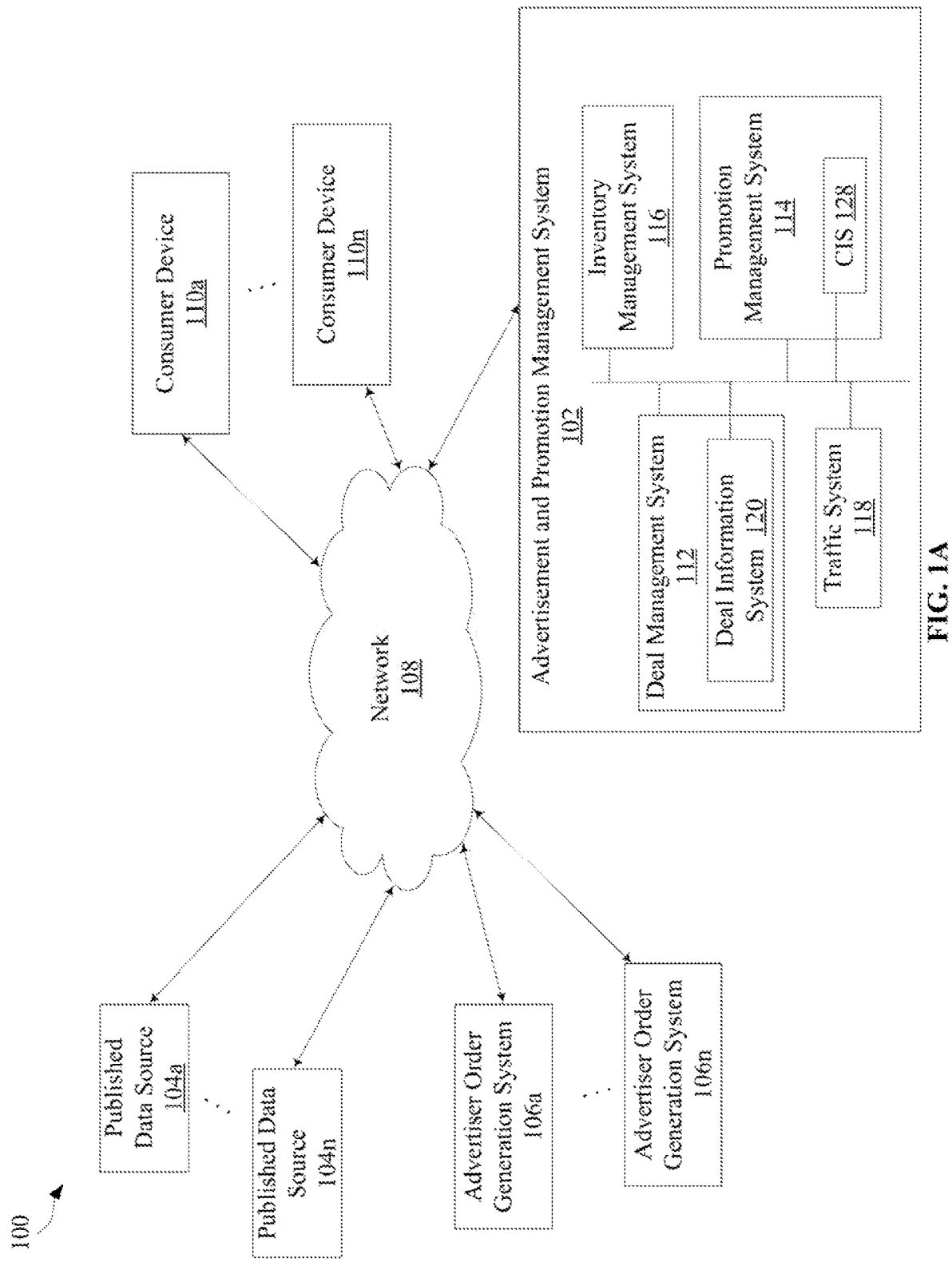
FIG. 1A is a block diagram that illustrates an exemplary system for promotion planning for managing allocation of inventory mix utilizing an optimization framework, in accordance with an exemplary embodiment of the disclosure.

Certain embodiments of the disclosure may be found in a method and system for promo planning for managing allocation of inventory mix utilizing an optimization framework. The promotion planning is provided in a mixed inventory allocation system that simplifies allocation of inventory units, and makes optimal use of available inventory by concurrently allocating inventory units across all utilization types or a subset of the utilization types. Various embodiments of the disclosure provide an optimization framework to meet a plurality of defined parameters, for example, multiple objectives, for inventory unit allocations among various inventory utilization types. The plurality of defined parameters corresponds to maximization of, for example, a revenue parameter for a certain amount of available inventory units that corresponds to aggregate capacity of non-programming airtime, as well as minimization of a total penalty that may arise from deviations of obligatory target values specified in the deals for advertisers and/or promotional campaigns.

In accordance with various embodiments of the disclosure, a media management system such as an advertising and promotion management system that handles a plurality of deals for a plurality of advertisers and a plurality of promotional campaigns, is configured to generate an expected audience of a promo schedule for each of the plurality of promotional campaigns that are planned for a specified upcoming time-frame. The media management system is further configured to acquire historical data for the plurality of promotional campaigns planned for the specified upcoming time-frame, and generate a plurality of values associated with a promotion impact measure for each of the plurality of promotional campaigns based on the acquired historical data and the expected audience. The media management system is further configured to predict inventory unit needs for each of the plurality of promotional campaigns that corresponds to a promotion inventory utilization type of a plurality of inventory utilization types, based on at least the generated plurality of values. The media management system is further configured to utilize the determined inventory units for each of the plurality of promotional campaigns to dynamically allocate inventory units from a defined amount of inventory units to each inventory utilization type of the plurality of inventory utilization types to meet a plurality of defined parameters for the defined amount of inventory units for one or more specified durations until an end of the specified upcoming time-frame.

The media management system is further configured to determine reserve inventory units for each of the plurality of promotional campaigns that corresponds to the promotion inventory utilization type for the specified upcoming time-frame. The media management system is further configured to acquire historical viewership data for airings of a television show similar to that of another television show that is to be promoted when there is no prior historical data, and/or for defined number of weeks prior to a date of planning of the plurality of promotional campaigns for the specified upcoming time-frame for the determination of the amount of inventory units required for one or more of the plurality of promotional campaigns. The media management system is further configured to estimate an expected audience to view a plurality of television shows after launch date of the plurality of television shows that are promoted in the plurality of promotional campaigns, based on a baseline audience forecast, and a plurality of values for the promotion impact measure achieved with respect to the plurality of television shows based on historical viewership data of television shows similar to that of the plurality of television shows to be promoted when there is no prior historical data, wherein the estimation of the expected audience is further utilized for the determination of the inventory units required for the plurality of promotional campaigns. The media management system is further configured to schedule a plurality of non-programming content items in accordance with the allocated inventory units among the each inventory utilization types for the one or more specified durations to meet the plurality of defined parameters. The plurality of defined parameters corresponds to maximization of a rating parameter and a revenue parameter for the defined amount of inventory units and minimization of a total penalty from deviations of obligatory target values arising from the plurality of deals for the plurality of advertisers and/or the plurality of promotional campaigns.

In general, the broadcast year in the United States starts in late September/early October. Network providers typically announce their programming schedules for the new broadcast year about mid-May. Throughout this document, the terms broadcast provider or broadcast operator, and network provider or network operator may be utilized interchangeably. These announcements are shortly after followed by an intensive sales period known as the upfront market, in which networks sell around 60 to 80% of their commercial airtime. The upfront market represents the first selling wave of units in a new broadcast year for broadcast or cable networks, and usually occurs around mid-May after the new fall schedules have been announced, and presented to major advertisers. The remaining unsold commercial airtime which corresponds to remaining inventory units may be used in different ways throughout the broadcast year: a portion of that time is committed to cable operator breaks and the rest may be sold in different types of markets, such as the scatter market, filler market, or programmatic inventory utilization type. It may also be used for promotion, or to clear liability of deals that are projected to have an impression shortfall via UD.

Independent of the market type, network providers and advertisers, which are usually represented by advertiser agencies, may go for a few rounds of negotiations in which details of a sales proposal are ironed out. The sales proposal specifies the flighting dates, a total budget, cost per thousand impressions (CPM), quarterly impression distribution, selling title mix, spot length mix (proportion of 15-second spots, 30-second spots, etc.), a primary demographic that the advertiser is trying to reach (for instance F25-54, which stands for 25 to 54-year-old females), and a guaranteed audience level in that target demographic. The flighting dates represent the date range in which the spots will air. Additionally, weekly distribution goals may be specified, and in instances where weekly distribution goals are not specified, equitable distribution across weeks is typically expected. The selling title may refer to the program in which an inventory bucket airs. One programming break, for example, a 120 seconds interval of non-programming airtime, usually includes one or more inventory buckets, and each inventory bucket may represent an inventory unit. In this regard, the inventory bucket typically inherits the selling title in which it is scheduled. In other words, the selling title is an interval of programming time that a network provider utilizes to sell commercial airtime, and it may comprise a particular show (Dallas, Cougar Town, etc.) or a block or time (Daytime—8:00 AM to 3:00 PM, Overnight—12:00 midnight to 6:00 AM, etc.). In some cases, the term daypart may be utilized as an alternative name for a selling title, but in other cases a daypart may be an aggregation of selling titles. It should readily be understood that although the discussions may refer to demos, the invention is not limited in this regard. Accordingly, commercial deals and promotional campaigns may be transacted based on other factors such as, for example, targeted audiences. For example, U.S. application Ser. No. 14/842,808 discloses a method and system for targeting and demographics scheduling utilizing a framework for audience rating estimation, U.S. application Ser. No. 14/930,559 discloses a method and system for audience proposal creation and scheduling utilizing a framework for audience rating estimation, and U.S. application Ser. No. 14/930,586 discloses a method and system for reach, mixture, and pricing utilizing a framework for audience rating estimation.

Once the proposal has been accepted by both parties, the proposal becomes a deal, and the network provider is liable for the total guaranteed impressions specified in the deal subject to various constraints. A media deal (deal) between an advertiser and a broadcast provider (network provider or network operator) generally specifies flighting dates, total budget, CPM, quarterly impression distribution, selling title mix, spot length mix, weekly distribution goals, primary demographic, ratecard type, and a guaranteed audience level in the target demographic. A deal starts as a proposal and becomes a deal when all terms are agreeable to both parties—advertiser, and network provider. Deal stewardship includes monitoring the performance of the deal and managing deal liability by the network provider. When the projected number of impressions throughout the entire flight of the deal falls short of the guaranteed impressions, additional unpaid units have to be allocated by the network provider to meet the liability for the deal. The impression liability of a deal is the difference between the guaranteed impressions and the total delivered impressions. While negative liability provides no additional revenue to the network provider, positive liability represents a financial commitment that must be met by the network provider. The liability is usually projected during the flighting of a deal, and additional unpaid units or inventory units for UD inventory utilization type may be allocated to the advertiser to reduce the expected liability. The inventory units for UD inventory utilization type are given to an advertiser to reduce the expected liability for a given deal. Ratecards are the metrics of audience in different target demos, and there are different classifications of what constitutes valid audience for a specific deal. These classifications are referred to as ratecard types. Exemplary ratecard types include live (average number of people watching a particular show when it airs, including both commercial airtime and programming), ACM3 (average audience watching only commercial airtime either live or within 3 days of airing via DVR systems), and ACM7 (same as ACM3 but with 7 days of delayed viewing).

Program audience levels are uncertain and may be challenging to forecast. Program audience levels may depend on a number of factors that include time-dependent attributes, such as time of the year, day of the week, and time of the day, as well as program-dependent attributes such as show type of shows, lead-in, and competing shows on other networks. Furthermore, while network providers are liable for unmet guaranteed impressions, the network providers do not receive any additional benefits for delivering impressions beyond the guaranteed levels. It is desirable for network providers to closely monitor and manage their allocations for all inventory utilization types. The allocation of the inventory units for different inventory utilization types other than the upfront inventory utilization type is performed in a dynamic environment in which, for example, changing business objectives, and/or changing market conditions may change the priorities of the inventory unit allocation mix. Although goals may be described in terms of gross impressions, the invention is not limited in this regard. For example, metrics such as reach (unduplicated audience), and frequency (number of times an individual watches a show), and so on may be used. Additional details on reach and frequency may be found in U.S. application Ser. No. 14/930, 586 discloses a method and system for reach, mixture, and pricing utilizing a framework for audience rating estimation.

The Inventory Mix Allocation Problem

Advertisers may be classified by industry category in which the advertiser falls, which is commonly referred to as a conflict code (for example, telecommunications, retailers, automotive, fast food restaurants, movies, etc.), and are usually trying to reach a specific demographic which they believe is most likely to consume their products. For example, an advertiser of male grooming products might target males 18+. Deals may have performance guarantees on the total audience or impressions in the advertiser's target demographic. The total audience delivered to a deal is the gross sum of impressions that fall into the target demographic regardless of duplication of impressions. Although the specific ratecard type (metrics of audience in different target demos) to be applied to a deal is determined during the sales process, specific audience levels are only forecasts at that time. The actual audience levels are provided by media rating agencies after the commercials have aired. In the United States, Nielsen Media Research (Nielsen) is one of the standards for broadcast and cable ratings. A deal is considered to be under performing if the gross sum of delivered audiences from spots that have aired plus the gross sum of estimated audiences from spots that haven't aired falls short of the guaranteed audience.

However, to meet multiple objectives (such as the defined plurality of parameters), the decisioning of what amount of inventory units should be allocated to each inventory utilization type should be accurate and executed quick enough to optimize the allocations proactively for a specified time horizon as the level of demand for commercial spot and promo campaigns may vary throughout the year.

FIG. 1A is a block diagram that illustrates an exemplary system for promotion planning for managing allocation of inventory mix utilizing an optimization framework, in accordance with an exemplary embodiment of the disclosure. Referring to FIG. 1A, the system 100, comprises an advertisement and promotion management system 102 that is communicatively coupled to published data sources 104a, . . . , 104n, and advertiser order generation systems 106a, . . . , 106n, via a network 108. There is shown consumer devices 110a, . . . , 110n that are communicatively coupled to the network 108. The advertisement and promotion management system 102 may comprise a deal management system 112, a promotion management system 114, an inventory management system 116, and a traffic system 118. The deal management system 112 may comprise deal information system 120. The promotion management system 114 may comprise a campaigns information system 128.

The advertisement and promotion management system 102 may comprise suitable logic, circuitry, and interfaces that may be configured to execute code that handles distribution (broadcast, multicasting, etc) of content comprising audio, video, and/or data. The advertisement and promotion management system 102 may be operated by a broadcasting company, which may be referred to as a broadcast provider or operator, or a network provider or operator. The broadcast provider may handle a single channel or a plurality of channels, or one or more networks. The broadcast provider may be operable to distribute content via one or more channels, for example, traditional over-the-air broadcast channels, cable television networks, satellite communication networks, the Internet, and/or other content delivery networks (CDNs).

Each of the plurality of published data sources 104a, . . . , 104n may be coupled to one or more television networks and may comprise suitable logic, circuitry, and interfaces that may be configured to execute code that provides actual audiences for programs that were aired. As illustrated in FIG. 1A, the plurality of published data sources 104a, ..., 104n are coupled to the advertisement and promotion management system 102 via the network 108. An exemplary published data source may be Nielsen. Another exemplary published data source may be a published database that provides ratings for a media item. The GRP is the total impression scaled by the potential people (universe of people) watching and advertiser media schedule.

The advertiser order generation systems 106a, ..., 106n may comprise suitable logic, circuitry, and interfaces that may be configured to place orders with the broadcasting company that include information about spots to be broadcast, the number of spots to be broadcast, and when should the spots be aired. The advertisement and promotion management system 102 may be configured to electronically receive, via the network 108, deals comprising advertisers' orders from the plurality of advertiser order generation systems 106a, ..., 106n. The traffic system 118 may be configured to receive an advertiser's order to place one or more spots into one or more commercial breaks. The advertiser order generation systems 106a, ..., 106n may provide multiple orders, which need not be submitted at the same time. Therefore, the traffic system 118 may continuously receive orders with new, additional spots, or modified constraints for the current spots to be placed and may need to update any previously determined commercial break schedule to accommodate the constraints and requirements of those spots already placed and of the new spots being received. In this regard, the advertiser order generation systems 106a, ..., 106n may electronically book spots to a selling title (ST). The advertiser's order comprises airing constraints and placement requirements corresponding to the one or more spots, and each of the one or more commercial breaks comprises a plurality of inventory buckets. The airing constraints corresponding to each of the one or more spots comprise, for example, one or more of network constraints, selling title constraints, inventory utilization type constraints, allowable date and time constraints, and advertiser conflict constraints. The placement requirements corresponding to each of the one or more spots comprise, for example, one or more of associative constraints, position constraints, time separation constraints, franchise and/or title exclusion constraints, and spot pinning constraints. The associative constraints define the positioning of any two or more spots relative to each other within the same one of the at least one of the plurality of inventory buckets or in adjacent inventory buckets. The position constraints define the positioning of any one spot in one of the at least one of the plurality of inventory buckets and/or in a commercial break.

The network 108 may be any kind of network, or a combination of various networks, and it is shown illustrating the communication that may occur between the advertiser order generation systems 106a, ..., 106n and the advertisement and promotion management system 102. For example, the network 108 may comprise one or more of a cable television network, the Internet, a satellite communication network, a wide area network (WAN), a medium area network (MAN), and a local area network (LAN).

The consumer devices 110a, ..., 110n may refer to end-user devices where the content is played to be viewed by a viewer. The number of impressions of a media item, such as an advertisement and/or promotional media, on such plurality of consumer devices 110a, ..., 110n determines the advertising impact or promotion impact and number of actual audiences achieved during campaigns. Examples of the consumer devices 110a, ..., 110n may include, but are not limited to connected TVs, connected TV with paired devices (e.g., tablets), and second screen devices such as smartphones and tablets, for example.

The deal management system 112 may comprise suitable logic, circuitry, and interfaces that may be configured to handle a plurality of deals for a plurality of advertisers. A media deal (deal) between an advertiser and the broadcast or network provider (network operator) generally specifies flighting dates, total budget, CPM, quarterly impression distribution, selling title mix, spot length mix, weekly distribution goals, primary demographic, ratecard type, and a guaranteed audience level in a target demographic. A deal starts as a proposal and becomes a deal when all terms are agreeable to both parties—advertiser, and network provider. Deal stewardship includes monitoring the performance of the deal and managing deal liability by the network provider. When the projected number of impressions throughout the entire flight of the deal falls short of the guaranteed impressions, additional unpaid units have to be allocated by the network provider to meet the liability for the deal. The impression liability of a deal is the difference between the guaranteed impressions and the total delivered impressions. While negative liability provides no additional revenue to the network provider, positive liability represents a financial commitment that must be met by the network provider. The liability is usually projected during the flighting of a deal, and additional unpaid units, commonly referred to as under delivery inventory units may be allocated to the advertiser to reduce the expected liability. The under delivery inventory units are given to an advertiser to reduce the expected liability for a given deal. Ratecards are the metrics of audience in different target demos, and there are different classifications of what constitutes valid audience for a specific deal. These classifications are referred to as ratecard types. Exemplary ratecard types include live (average number of people watching a particular show when it airs, including both commercial airtime and programming), ACM3 (average audience watching only commercial airtime either live or within 3 days of airing via DVR systems), and ACM7 (same as ACM3 but with 7 days of delayed viewing).

The promotion management system 114 may comprise suitable logic, circuitry, and interfaces that may be configured to handle a plurality of promotional campaigns. The promotion management system 114 may be configured to determine reserve inventory units required for each of the plurality of promotional campaigns that corresponds to a promotion inventory utilization type for a specified upcoming time-frame, for example, next quarter of a broadcast year. The reserve inventory units for the promotion inventory utilization type may also be referred to as promotion needs or promo needs. The reserve inventory units or promo needs represents a minimum reserve kept for promotion inventory utilization type stocked for specified upcoming time-frame. The reserve inventory units for the promotion inventory utilization type may be determined based on historical data of an amount of inventory units utilized previously under the promotion inventory utilization type for the same specified upcoming time-frame. Further, the reserve inventory units for the promotion inventory utilization type may also be determined based on a need of inventory units for the promotion inventory utilization type as anticipated by a marketing user.

The inventory management system 116 may comprise suitable logic, circuitry, and interfaces that may be configured to execute a code that handles the reserves for various inventory utilization types. In this regard, the inventory management system 116 may handle the setup of reserves for the plurality of inventory utilization types, and establish the inventory units for the allocation among the plurality of inventory utilization types, based on an optimal allocation of inventory mix solution that may be generated by a system for allocation of inventory mix (described in details with respect to FIG. 1B).

The traffic system 118 may comprise suitable logic, circuitry, and interfaces that may be configured to execute code that receives deal information from deal management system 112 and campaign information from the promotion management system 114. The traffic system 118 may be associated with a scheduler 126, which may include a spot scheduler 126A and a promo scheduler 126B (shown and described in FIG. 1B). The traffic system 118 may be configured to receive cleared and/or modified orders of a plurality of media owners and queue them determine placement of the corresponding media items in a media feed (such as a program stream) of each of one or more channels. The cleared and/or modified orders may be received from the inventory management system 116. In this regard, the cleared and/or modified orders may comprise orders that have been created or generated based on estimated reserves for each inventory utilization types. The traffic system 118 may assign the cleared and/or modified orders that are queued to an available scheduler 126 to handle scheduling of the one or more channels for distribution. A programming schedule of a channel (generated and modified by the scheduler 126) defines what media content should be scheduled, the ordering of the media content during playout, and when to distribute. In this regard, the traffic system 118 is configured to receive periodically advertisers orders from the plurality of advertiser order generation systems 106a, . . . , 106n, deal management system 112, and the promotion management system 114, and place one or more spots for different inventory utilization types into one or more commercial breaks (also referred to as advertisement and promotion space) appearing in a same selling title or different selling titles.

The deal information system 120 is provided in the deal management system 112. The deal information system 120 may comprise suitable logic, circuitry, and interfaces that may be operable to execute code that handles processing of deals and comprises information for all deals.

In operation, the advertisement and promotion management system 102 may be configured to handle a plurality of deals for a plurality of advertisers and a plurality of promotional campaigns. The plurality of deals may be handled by the deal management system 112 of the advertisement and promotion management system 102. The plurality of promotional campaigns may be handled by the promotion management system 114 of the advertisement and promotion management system 102. The advertisement and promotion management system 102 may retrieve input and/or parameters for each of the plurality of deals that corresponds to an upfront inventory utilization type and commercial operator break (COB) inventory utilization type, of a plurality of inventory utilization types. The deal information system 120 comprises information for the plurality of deals. The promotion management system 114 may be configured to determine reserve inventory units for each of the plurality of promotional campaigns that corresponds to a promotion inventory utilization type of the plurality of inventory utilization types for a specified upcoming time-frame. An example of the specified upcoming time-frame is shown and described in FIG. 4B. The advertisement and promotion management system 102 may be configured to dynamically allocate inventory units from a defined amount of inventory units among each inventory utilization types of the plurality of inventory utilization types to meet the plurality of defined parameters for the defined amount of inventory units for one or more specified durations (such as one or more weeks) until end of the specified upcoming time-frame. The plurality of inventory utilization types consumes different portions of the defined amount of inventory units based on the allocation of the inventory units. An example of the plurality of inventory utilization types is shown and described in FIG. 2. The plurality of defined parameters corresponds to maximization of a revenue parameter for the defined amount of inventory units and minimization of a total penalty from deviations of obligatory target values arising from the plurality of deals for the plurality of advertisers and/or the plurality of promotional campaigns.

The advertising and promotion management system 102 handles a plurality of deals for a plurality of advertisers and a plurality of promotional campaigns, receives input and/or parameters for each of the plurality of deals that corresponds to an upfront inventory utilization type and commercial operator break (COB) inventory utilization type, of a plurality of inventory utilization types. Reserve inventory units for each of the plurality of promotional campaigns that corresponds to a promotion inventory utilization type of the plurality of inventory utilization types, are determined for a specified upcoming time-frame. Inventory units from a defined amount of inventory units are dynamically allocated among each inventory utilization types of the plurality of inventory utilization types to meet the plurality of defined parameters for the defined amount of inventory units for one or more specified durations until end of the specified upcoming time-frame. The plurality of inventory utilization types, which consume different portions of the defined amount of inventory units based on the allocation of the inventory units, include, but are not limited to, a scatter, an under delivery (UD) or audience deficiency units (ADUs), a filler, and/or a programmatic inventory utilization type in addition to the upfront inventory utilization type, the COB inventory utilization type, and the promotion inventory utilization type. A demand value may be estimated for inventory units by selling title per specified duration (such as per week) until end of the specified upcoming time-frame for the scatter and the programmatic inventory utilization types. Minimum inventory units may be required for the UD and the filler inventory utilization types for the specified upcoming time-frame to meet, for example, a liability reduction goal parameter, a strategic programmatic parameter, and/or a strategic filler volume parameter. The minimum inventory units required for the UD, the filler, and programmatic inventory utilization types are further determined for the specified upcoming time-frame based on a difference of inventory avails that corresponds to the defined amount of inventory units and the estimated demand value for inventory units for the scatter inventory utilization.

The advertising and promotion management system 102 may determine whether a current value of actual demand units for the scatter inventory utilization type for the first specified duration is less than the estimated demand value for inventory units for the first specified duration for the scatter and programmatic inventory utilization types. Inventory units may be re-allocated from inventory avails to the UD, the filler, and the programmatic inventory utilization types for the first specified duration based a value calculated for determined minimum inventory units required for the UD and the filler inventory utilization types, and the estimated demand value for inventory units for the programmatic inventory utilization type. The re-allocation of the inventory units from inventory avails to the UD, the filler, and the programmatic inventory utilization types may be executed based on a determination that the current value of the actual demand units for the scatter inventory utilization type for the first specified duration is less than the estimated demand value for inventory units for the first specified duration for the scatter and the programmatic inventory utilization types.

Figure 1B:
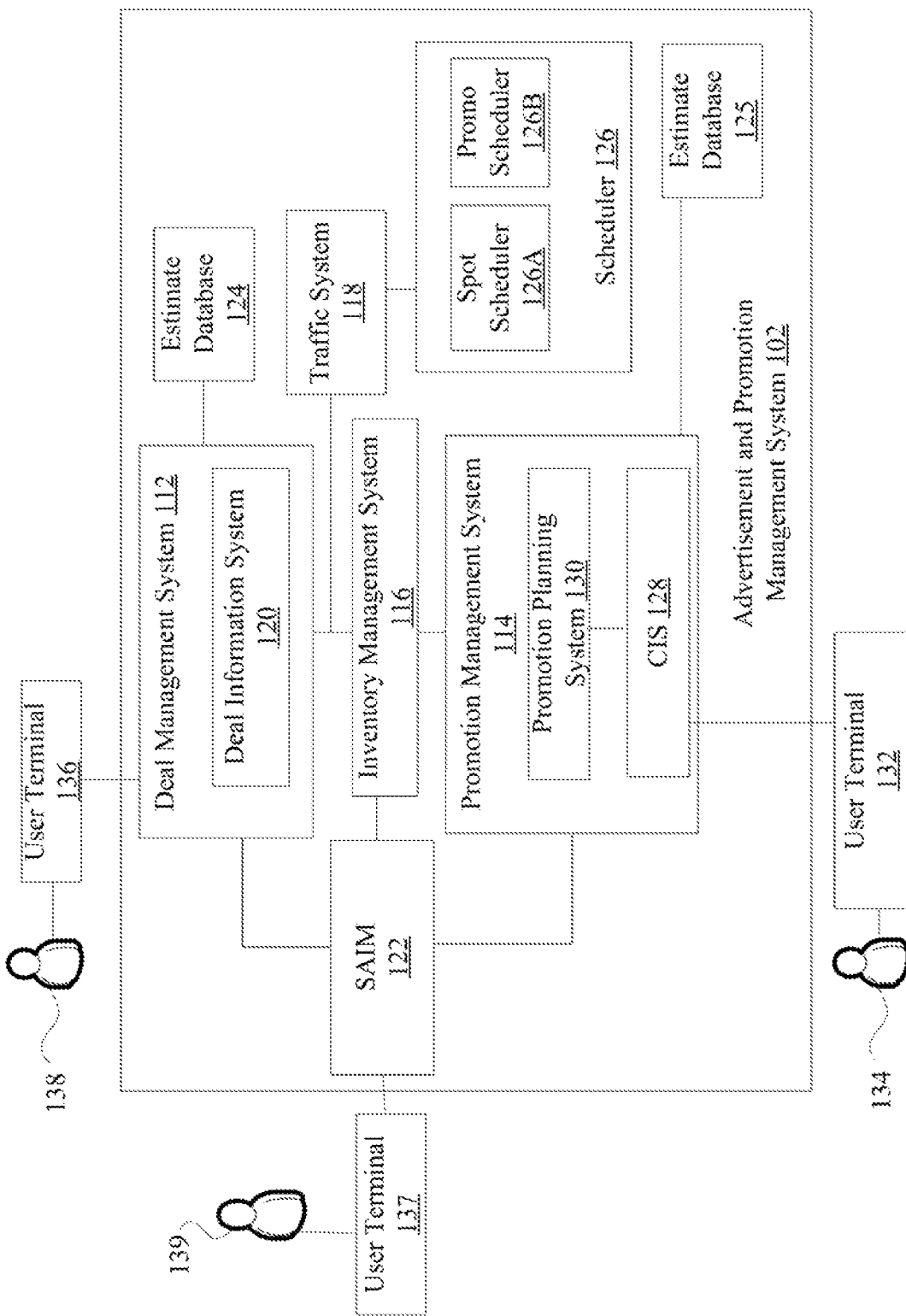
FIG. 1B is a block diagram that illustrates an exemplary advertisement and promotion management system for managing allocation of inventory mix utilizing an optimization framework, in accordance with an exemplary embodiment of the disclosure.

FIG. 1B is a block diagram that illustrates an exemplary advertisement and promotion management system for managing allocation of inventory mix utilizing an optimization framework, in accordance with an exemplary embodiment of the disclosure. Referring to FIG. 1B, the advertisement and promotion management system 102 may further comprise a deal information system 120, a system for allocation of inventory mix (SAIM) 122, estimate databases 124, 125, a scheduler 126, a campaigns information system 128, a promotion planning system 130, and one or more user terminals, such as a (first) user terminal 132 associated with a marketing user 134, another (second) user terminal 136 associated with a sales user 138, and a another (third) user terminal 137 associated with a user 139. The scheduler 126 may include a spot scheduler 126A and a promo scheduler 126B. There is also shown the deal management system 112, the promotion management system 114, the inventory management system 116, and the traffic system 118, as described in FIG. 1.

In some embodiments of the disclosure, the deal management system 112, the promotion management system 114, the inventory management system 116, and the SAIM 122 may be integrated to form an integrated system. In some embodiments of the disclosure, as shown, the deal management system 112 may be distinct from the promotion management system 114, the inventory management system 116, and the SAIM 122. In some embodiments of the disclosure, the spot scheduler 126A and the promo scheduler 126B may be integrated as a single scheduling system, such as the scheduler 126. In some embodiments of the disclosure, the scheduler 126 may be a part of the traffic system 118 to form an integrated system. In some embodiments of the disclosure, the scheduler 126 may be located separately from the traffic system 118. Other separation and/or combination of the various entities of the exemplary advertisement and promotion management system illustrated in FIG. 1B may be done without departing from the spirit and scope of the various embodiments of the disclosure.

The SAIM 122 may comprise suitable logic, circuitry, and interfaces that may be configured to execute code that handles the allocation of the plurality of inventory utilization types utilizing an optimization framework. The SAIM 122 interfaces with various hardware components in the advertisement and promotion management system 102, for example, the deal management system 112, the promotion management system 114, the inventory management system 116, and the traffic system 118. The promotion management system 114 may be configured to receive input from a promotion planner, such as the marketing user 134, via, for example, the user terminal 132. The SAIM 122 may suitably respond to an update in the promotion management system 114 as a result of the received input from the user terminal 132. The deal management system 112 may be configured to receive input from the sales user 138, via, for example, the user terminal 136. The SAIM 122 may also suitably respond to an update in the deal management system 112 as a result of the received input from the user terminal 136. The SAIM 122 may be configured to acquire or receive information for one or more deals from the deal information system 120, a user 139 of the user terminal 137, the promotion planning system 130, and/or the inventory management system 116 and utilize the received information to generate an optimal allocation of a defined number of inventory units among the plurality of inventory utilization types. In an exemplary embodiment of the disclosure, the user 139 and user terminal 137 may be utilized to provide information such as user priorities and objectives (e.g. liability for a time period such as a quarter, and/or emphasis to be placed on liability) to the SAIM 122.

The estimate database 124 may be utilized to store estimates such as estimates or projections of the audience for programs that will air. The campaigns information system 128 may comprise suitable logic, circuitry, and interfaces that may be configured to execute a code that handles processing of promotional campaigns and comprises information for all campaigns. The estimate database 125 may be utilized to store estimates, which are generated by the promotion planning system 130, of expected audience for the television show that is to be promoted. The estimate databases 124, and 125 may be integrated as a single database, or may be separate estimate databases as illustrated.

The scheduler 126 may comprise suitable logic, circuitry, and interfaces that may be configured to execute a code that handles a programming schedule of a channel. The programming schedule of a channel defines what media content should be scheduled, the ordering of the media content during playout, and when to distribute the content. The media content that is distributed may include both the programming content, such as long-form presentations, short-form presentations, news or sporting events; and non-programming content, such as paid advertisements, public service advertisements, or promotional material. As the programming schedule defines an aggregate capacity of non-programming airtime, it usually translates to total inventory units available for different inventory utilization types. The mix of the total inventory units for the different inventory utilization types is balanced by the SAIM 122. The inventory management system 116 may establish the inventory units for the allocation among the plurality of inventory utilization types, based on an optimal allocation of inventory mix solution generated by the SAIM 122. The spot scheduler 126A may be configured to schedule one or more spots for different inventory utilization types (except promotional media that corresponds to promotion inventory utilization type) into one or more commercial breaks (which are part of non-programming airtime) appearing in a same selling title or different selling titles. It is to be understood that a commercial break have multiple inventory buckets where inventory units that corresponds to different (or even same) inventory utilization types, may be placed. The promo scheduler 126B may be configured to schedule promotional media (i.e. promotion inventory utilization type of the different inventory utilization types) in the non-programming airtime based on information received from traffic system 118.

The promotion planning system 130 may comprise suitable logic, circuitry, and interfaces that may be configured to execute a promotion planning process. The promotion planning system 130 may be configured to estimate an expected audience to view a television show after a launch date of the television show that is to be promoted in one of the plurality of promotional campaigns. It should readily be understood that the various embodiments of the disclosure are not limited to a television show but are applicable to any type of media content. The promotion planning system 130 may be configured to estimate the expected audience for a television show that is to be promoted. The estimate database 125 may be utilized to store estimates of the expected audience for the television show that is to be promoted. The estimation of the expected audience may be stored in the estimate database 124, and may be utilized to determine an amount of inventory units required to meet the objectives of the promotional campaign associated with the television show. In accordance with an embodiment, the amount of inventory units required to meet the objectives of the promotional campaign for the television show may also be estimated based on a past state, a current state, and a future state associated with a television show that is to be promoted. The past state corresponds to a historical viewership data of another television show similar to the television show that is to be promoted when there is no prior historical data for the promotional campaign. The current state includes a type (or kind) of a television show that is to be promoted. The type of television show may correspond to a television show that is a new and original show, which has not been broadcasted before by any channel or network, a returning original show, an ongoing series, or a movie or special content. The type of television show may influence the amount of promotional inventory required. For example, a television show that happens to be an ongoing series may require less inventory units as compared to a new and original show. Further, the future state may correspond to a launch date of a television show, target audience of interest, and/or the number of television shows to be promoted in a specified upcoming time-frame (e.g. next quarter or a next broadcasting season or year). Thus, the promotion planning system 130 may also utilize the past state, the current state, and the future state information associated with one or more television shows to be promoted to determine the aggregate inventory units required for promotional campaigns. The functions and/or operations performed by the advertisement and promotion management system 102, and its various components, are further described, in FIGS. 2, 3A, 3B, 4A, 4B, 5A, 5B, 5C, and 6.

In accordance with an embodiment, the promotion planning system 130 may estimate an expected audience to view a plurality of television shows after launch date of the plurality of television shows that are promoted in the plurality of promotional campaigns. The expected audience may be estimated based on an offset (a specified constant), the generated baseline audience forecast, and the plurality of values for the promotion impact measure achieved with respect to the plurality of television shows in a first week of airing of the television shows, and for defined number of weeks prior to the estimation of the expected audience. The promotion planning system 130 may estimate the expected audience to view the plurality of television shows based on historical viewership data of television shows similar to that of the plurality of television shows to be promoted when there is no prior historical data. The estimation of the expected audience may be further utilized to determine the amount of inventory units required for the one or more promotional campaigns. The mathematical expression (1) below, may be used for the estimation of the expected audience.

Exemplary Estimation Model

The promotion planning system 130 may be configured to estimate an expected audience ($AA_i$) to view a television show that is promoted in at least one of the plurality of promotional campaigns, by use of the mathematical expression (1).

$$AA_i = \alpha + \beta_0[\text{Baseline}_i] + \Sigma_{j=0}^{K} \gamma_j(\text{GRPs}_{ij}) \qquad (1)$$

Where, $AA_i$=Average audience achieved for a telecast, or group of telecasts to which a promotional campaign as focused on driving tune in to, "i=1, 2, ... n indexes the campaigns;

$\alpha$=An offset, such as a specified constant;

$\beta_0[\text{Baseline}_i]$=A baseline audience; this could be the network's typical average audience performance for the time and day of the scheduled telecast(s) of interest, or the estimated audience of the lead-in to a telecast or group of telecasts;

$\Sigma_{j=0}^{K} \gamma_j(\text{GRPs}_{ij})$=Gross impressions achieved weekly for the promotional media schedule for campaign i, for the defined number of weeks of the promotional campaign, j=0, 1, 2, 4 ... (j is the weeks leading up to the campaign i), k=refers to the lag in terms of the total number of weeks of a promotional campaign.

The baseline audience forecast may be generated for audience-based targets and/demographics for the plurality of promotional campaigns that are planned for the specified upcoming time-frame. For the baseline audience forecast, audience rating estimates, lead-in audience estimates, and/or other research-based forecast, may be used. The estimation can be used to determine the campaign goals in terms of gross rating points (GRPs), which will then be used to compute promo inventory needs.

The estimation of the expected audience is utilized to determine an amount of inventory units required for a particular promotional campaign related to the television show (a promo) of the plurality of promotional campaigns. An exemplary mathematical model is now provided for estimation of promo inventory needs.

Aggregate Promo Inventory Needs Optimization

The following is a high-level description of an exemplary mathematical programming problem that can be used to compute the promo inventory that is needed to achieve the promo campaign goals defined in terms of gross rating points (GRP's).

Sets:
C=Set of promotional campaigns to be planned.
$P_j$=Set of promo groups (sub-campaigns) for campaign j, $\forall j \in C$. [Note: a campaign can have one or more promo groups].
$N_H$=Set of broadcaster-owned networks for promo planning.
$N_O$=Set of off-channel networks for promo planning.
$N = N_H \cup N_O$=Set of all networks for promo planning.
$S_n$=Set of selling titles for network n, $\forall n \in N$.
W=Set of weeks in the planning horizon.

Parameters:
$G_i^D$=The demo GRP goal for promo group i. $\forall j \in C$, $\forall i \in P_j$.
$G_i^T$=The target GRP goal for promo group i. $\forall j \in C$, $\forall i \in P_j$.
$H_j$=The host network for campaign j. $\forall j \in C$.
$\hat{A}_{nsw}^D$=Estimated demo GRPs in network n, selling title s, week w. $\forall n \in N$, $\forall s \in S_n$, $\forall w \in W$
$\hat{A}_{nsw}^T$=Estimated target GRPs in network n, selling title s, in week w. $\forall n \in N$, $\forall s \in S_n$, $\forall w \in W$ $q_s^i$=The maximum proportion of units from selling title s that can be assigned to promo group i.

$R_{nsw}$=Rate for units in network n, selling title s, week w. $\forall n \in N, \forall s \in S_n, \forall w \in W$ (Rates could be constant across weeks).

$I_{nsw}$=Number of available airtime units in network n, selling title s, week w. $\forall n \in N, \forall s \in S_n, \forall w \in W$ $q_{ns_1}^i, q_{n_1}^i, q^i$=The minimum proportion of units that should be allocated respectively to selling title $s_1$, network $n_1$, and all off-channel networks.

$Q_{ns_1}^i, Q_{n_1}^i, Q^i$=The maximum proportion of units that should be allocated respectively to selling title $s_1$, network $n_1$, and all off-channel networks.

Decision Variables:

$x_{nsw}^i$=Number of units to be allocated for promo group i in network n, selling title s, week w.

$$\forall j \in C, \forall i \in P_j, \forall n \in N, \forall s \in S_n, \forall w \in W$$

Formulation:

$$\text{Minimize} \quad \sum_i \sum_n \sum_s \sum_w R_{nsw} x_{nsw}^i$$

$$\text{Such that} \quad \sum_n \sum_s \sum_w A_{nsw}^D x_{nsw}^i \geq G_i^D \quad \forall j \in C, \forall i \in P_j$$

$$\sum_n \sum_s \sum_w A_{nsw}^T x_{nsw}^i \geq G_i^T \quad \forall j \in C, \forall i \in P_j$$

$$q_{ns_1}^i \leq \frac{\sum_w x_{ns_1w}^i}{\sum_s \sum_w x_{nsw}^i} \leq Q_{ns_1}^i \quad \forall j \text{ in } C, \forall i \in P_j, \forall n \in N, \forall s_1 \in S_n$$

$$q_{n_1}^i \leq \frac{\sum_s \sum_w x_{n_1sw}^i}{\sum_n \sum_s \sum_w x_{nsw}^i} \leq Q_{n_1}^i \quad \forall j \text{ in } C, \forall i \in P_j, \forall n_1 \in N$$

$$q^i \leq \frac{\sum_{n_o} \sum_s \sum_w x_{nsw}^i}{\sum_n \sum_s \sum_w x_{nsw}^i} \leq Q^i \quad \forall j \text{ in } C, \forall i \in P_j$$

$$\sum_i x_{nsw}^i \leq I_{nsw} \quad \forall n \in N, \forall s \in S_n, \forall w \in W$$

$$x_{nsw}^i \in \mathbb{Z}^+ \quad \forall n \in N, \forall s \in S_n, \forall w \in W$$

This formulation minimizes the value of the inventory required to meet the demo GRP goal and the target GRP goal of all the promotional campaigns. The first and second set of constraints enforce that the demo and target GRP goals for every promo group must be met, respectively. The third, fourth, and fifth set of constraints establish minimum and maximum limits on the proportion of units that that should be allocated respectively to selling title $s_1$, network $n_1$, and all off-channel networks. The sixth set of constraints states that the allocation of units is limited by the number of units that are available for each network-selling title-week. Finally, variables $x_{nsw}^i$ are defined over the set of nonnegative integers.

This is an exemplary formulation. Alternative objective functions can be employed which may use different metrics of inventory value (for instance, number of units as opposed to dollar-weighted units) as well as additional terms such as penalty terms that quantify deviations from desired goals such as the demo and target GRP goals. Likewise, the maximum and minimum proportions presented in terms of units allocated could alternatively be expressed as proportions of dollar value, proportions of demo GRPs, proportions of target GRPs, proportions of different groupings of inventory (for instance dayparts instead of selling titles). Furthermore, additional constraints that may appear in promo planning can also be accommodated such as:

Maximum number of units per promo group or campaign (total, by network, by network type, by selling title, by selling title-week)

Equitable distribution across weeks or skewed distribution based on relative avails across weeks.

Limit on the dollar value of the inventory assigned to promo groups or campaigns.

Upper and lower limits on the efficiency of an allocation (for instance in terms of an index of dollar value consumed over demo or target GRPs yield).

This determined amount of inventory units required for the particular promotional campaign, and other campaigns of the plurality of promotional campaigns may be stored in the campaigns information system 128, and utilized by the SAIM 122 for the allocation of the inventory units to the various inventory utilization types, as described in FIGS. 3A, 3B, 4B, 5A, and 5B. It is to be understood that there is a difference between generating a forecast and computing a baseline audience which is used to model the sensitivity of audience to a change in weekly gross impressions leading up to a campaign. Generating a forecast refers to forecasting the target impressions associated with inventory used to promote, tune-in to a specific telecast, or group of telecasts for a promo campaign.

Figure 2:
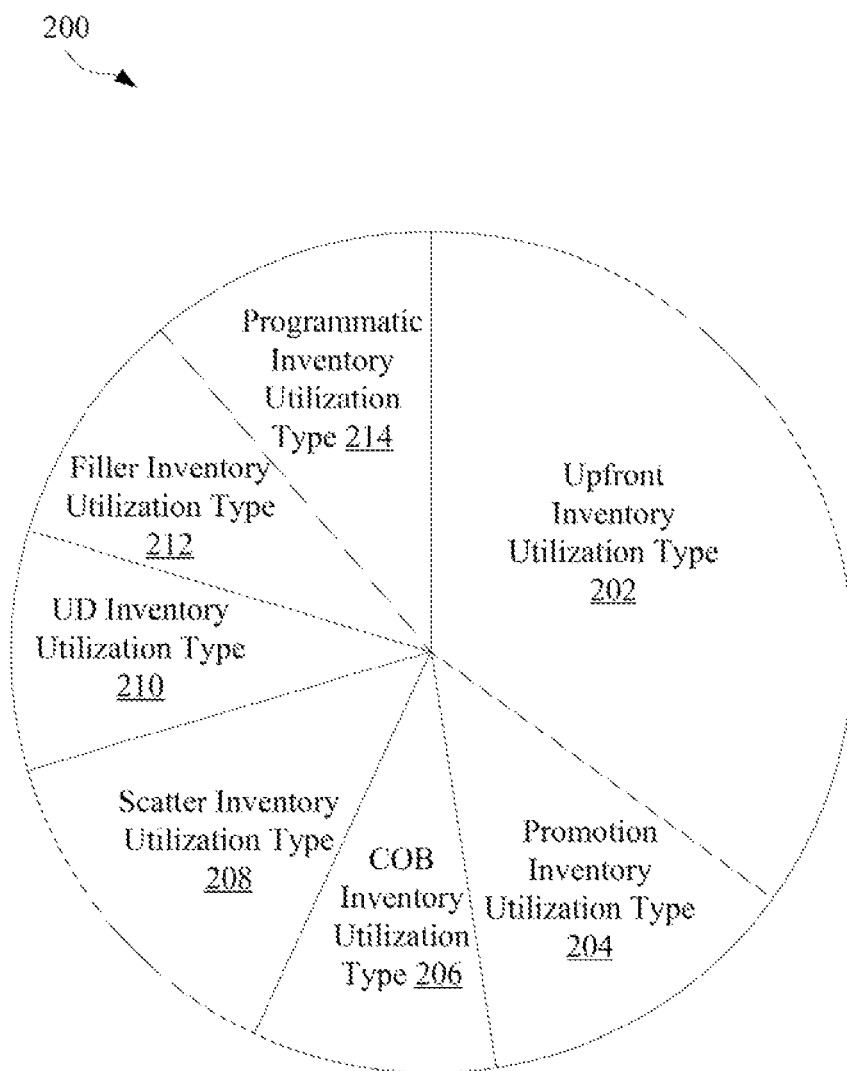
FIG. 2 illustrates different inventory utilization types in an exemplary pie chart to depict allocation of inventory mix by the advertisement and promotion management system of FIG. 1B, in accordance with an exemplary embodiment of the disclosure.

FIG. 2 illustrates different inventory utilization types in different proportions in an exemplary pie chart to depict allocation of inventory mix by the advertisement and promotion management system of FIG. 1B, in accordance with an exemplary embodiment of the disclosure. Referring to FIG. 2, there is shown a plurality of inventory utilization types in a graphical representation by means of an exemplary pie chart 200. The plurality of inventory utilization types includes an upfront inventory utilization type 202, a promotion inventory utilization type 204, a commercial operator break (COB) inventory utilization type 206, a scatter inventory utilization type 208, a under delivery (UD) inventory utilization type 210, a filler inventory utilization type 212, and/or a programmatic inventory utilization type 214. The plurality of inventory utilization types refers to different market types that consume different portions of a defined amount of inventory units (e.g. total amount of inventory units available for different inventory utilization types for at least one channel) in a certain time frame as specified by a broadcast or network provider.

The upfront inventory utilization type 202 refers to an upfront market that represents the first selling wave of inventory units in a new broadcast year for the broadcast or network provider, and usually occurs around mid-May, and presented to major advertisers. The broadcast year (or broadcast season) in the United States typically starts in late September/early October. Network providers typically announce their programming schedules for the new broadcast year about mid-May. Shortly after these announcements, an intensive sales period known as the upfront market follows, during which networks (network provider) sells the bulk of their inventory units, for example, 60 to 80% of their commercial airtime in advance. During this period, a few major advertisers, enter into a media deal (deal) with the broadcast or network provider at relatively typically lower value (such as lower margins) as compared to other types of inventory utilization types, such as the scatter inventory utilization type 208. The deals that correspond to the upfront market generally specify flighting dates, total budget, CPM, quarterly impression distribution, selling title mix, spot length mix, weekly distribution goals, primary demographic, ratecard type, and a guaranteed audience level to be achieved in a target demographic. The deals are handled by the deal management system 112 of the advertisement and promotion management system 102 as described in FIG. 1A.

The promotion inventory utilization type 204 refers to another type of inventory used to promote an upcoming show (or program) of a channel airing on a television network to the viewing audience. A plurality of promotional campaigns may be planned to promote one or more shows in advance. The promotion planning process by the promotion planning system 130 may be initiated for each quarter of a year before the end of the previous quarter. For example, no later than 6 weeks prior to start of a new quarter. For each promotional campaign, a target value based on a promotion impact measure, such as gross rating points by week, to be achieved may be specified for a particular targeted audience and/or demographics. Further, flighting dates, total budget, spot length mix, and/or selling title mix per campaign, for example, maximum or minimum number of impressions for each daypart, may also be specified for each promotional campaign. Additionally, a mix per network, for example, a mix of a host network promotion, a cross-network promotion, or an off-network promotion, may also be specified. The host network promotion refers to a promotion of a television show of a channel or network in the same channel or network, for example, promotion of an upcoming show of cable news network (CNN) channel in the same (i.e. a host) CNN channel. The cross-network promotion refers to a promotion of a television show of a different channel or network on a host network where the television show is promoted (e.g. promoting a Turner Broadcasting System (TBS) show on Turner Network Television (TNT)). The off-network promotion refers to promotion of media content items not owned by the host channel or other networks, for example, a new movie, or a special media content item (e.g. promoting a TBS show on USA Network, where USA Network has nothing to do with the Turner Portfolio of channels, the latter of which includes TBS).

The COB inventory utilization type 206 is also referred to as a cable operator break. In this case, a media content, such as local advertisements or promotional media content, may be inserted (usually by affiliates of the network provider, such as local cable operators) in a network feed, and such promotional media content distribution may be unique to a local station. Thus, the COB inventory utilization type 206 corresponds to non-programming time allocated to the cable operators that is fixed based on contract negotiations. After allocation of the upfront inventory utilization type 202, the promotion inventory utilization type 204, and the COB inventory utilization type 206 may be predictable.

The scatter inventory utilization type 208 refers to a scatter market that represents selling of commercial airtime that remains after the upfront market has concluded. After the upfront deals and estimation of aggregate inventory units requirement for the promotion inventory utilization type 204 and the COB inventory utilization type 206, the inventory units remaining from the defined amount of inventory units may be assigned for the scatter inventory utilization type 208 and sold on a spot market (or scatter market) throughout the broadcasting season or year. The remaining inventory units that correspond to unsold commercial airtime after deducing inventory units for the upfront inventory utilization type 202, the promotion inventory utilization type 204, and the COB inventory utilization type 206, are typically sold at higher rates throughout the broadcast year in what is known as the scatter market.

The UD inventory utilization type 210 may include reserve inventory units for UD scenarios kept in advance to meet obligatory target values that may possibly arise for the plurality of deals with the advertisers when the projected number of impressions in the upfront deals falls short of the guaranteed impressions for the specified upcoming time-frame, such as in the broadcast season. Typically, when the network provider enters into deals with advertisers in which the network provider is liable for total guaranteed impressions specified in the deal, the network provider has to monitor the projected number of impressions throughout the entire flight of the deal. In an event, the projected number of impressions falls short of the guaranteed impressions, the network provider has to allocate additional unpaid units in order to meet the liability for the deal. These unpaid units are known as audience deficiency units, make good units, or under delivery (UD) inventory units, which are generally referred to in the art as UD. The SAIM 122 may be configured to determine which of the plurality of deals have a guaranteed audience, and are under delivering. U.S. application Ser. No. 15/091,475, which was filed on Apr. 5, 2016, entitled "allocation of under delivery units utilizing an optimization framework," discloses, for example, an advertisement management system that utilizes a multistage optimization for allocation of under delivery units.

The filler inventory utilization type 212 corresponds to a market type, where certain number of inventory units may be used for sale. The filler inventory utilization type 212 refers to a comparatively short term market, for example, less than 2-3 weeks, with non-guaranteed audience. As an example, a prospective customer may be urged to respond immediately and directly to the advertiser, in response to a display of certain direct response mechanisms, such as a toll-free telephone number, or, via internet. The programmatic inventory utilization type 214 corresponds to inventory that may be available without direct sales.

Figure 3A:
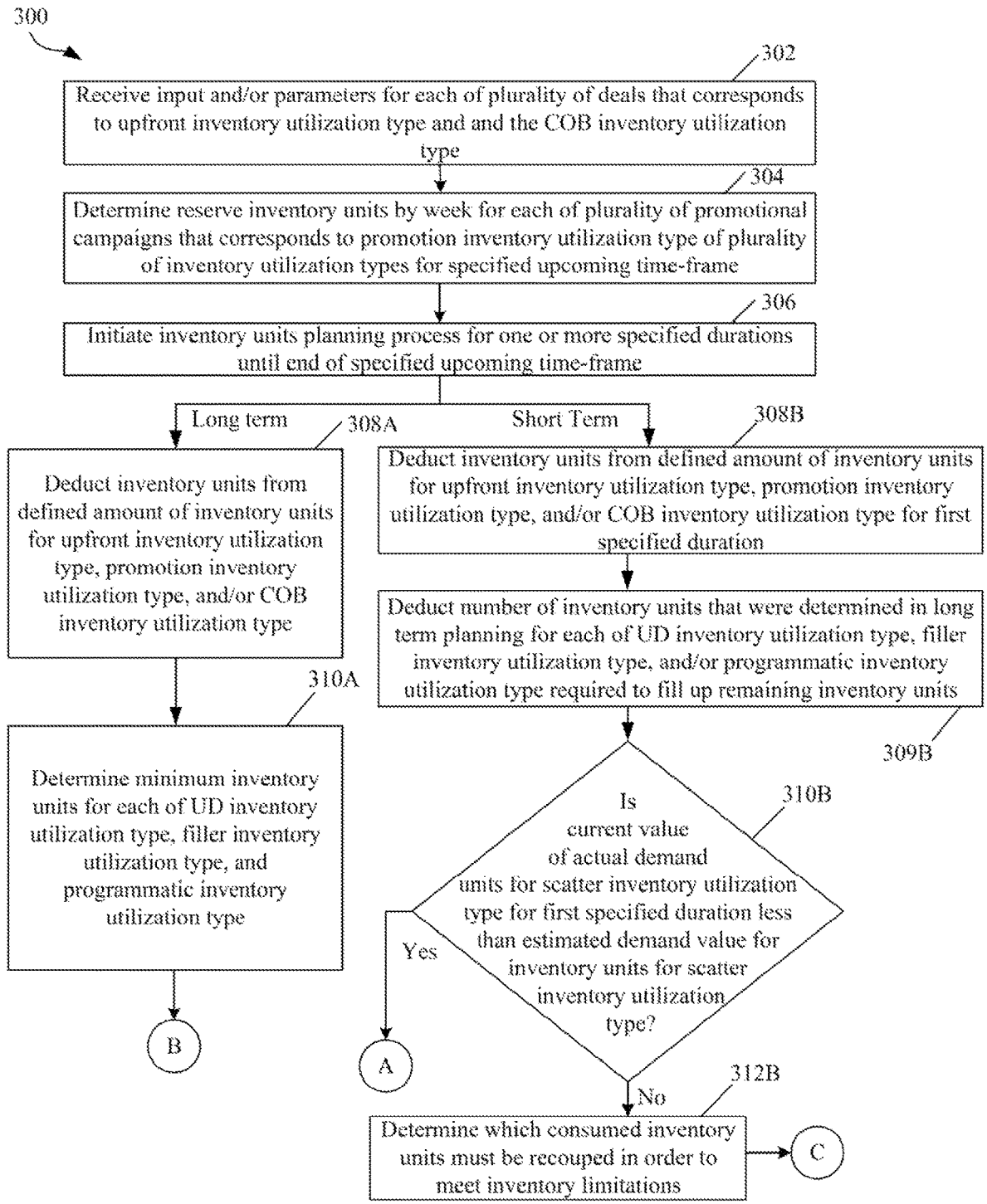
FIGS. 3A and 3B, collectively, depict a flow chart illustrating high-level operation of the advertisement and promotion management system of FIG. 1B, in accordance with an exemplary embodiment of the disclosure.
Figure 3B:
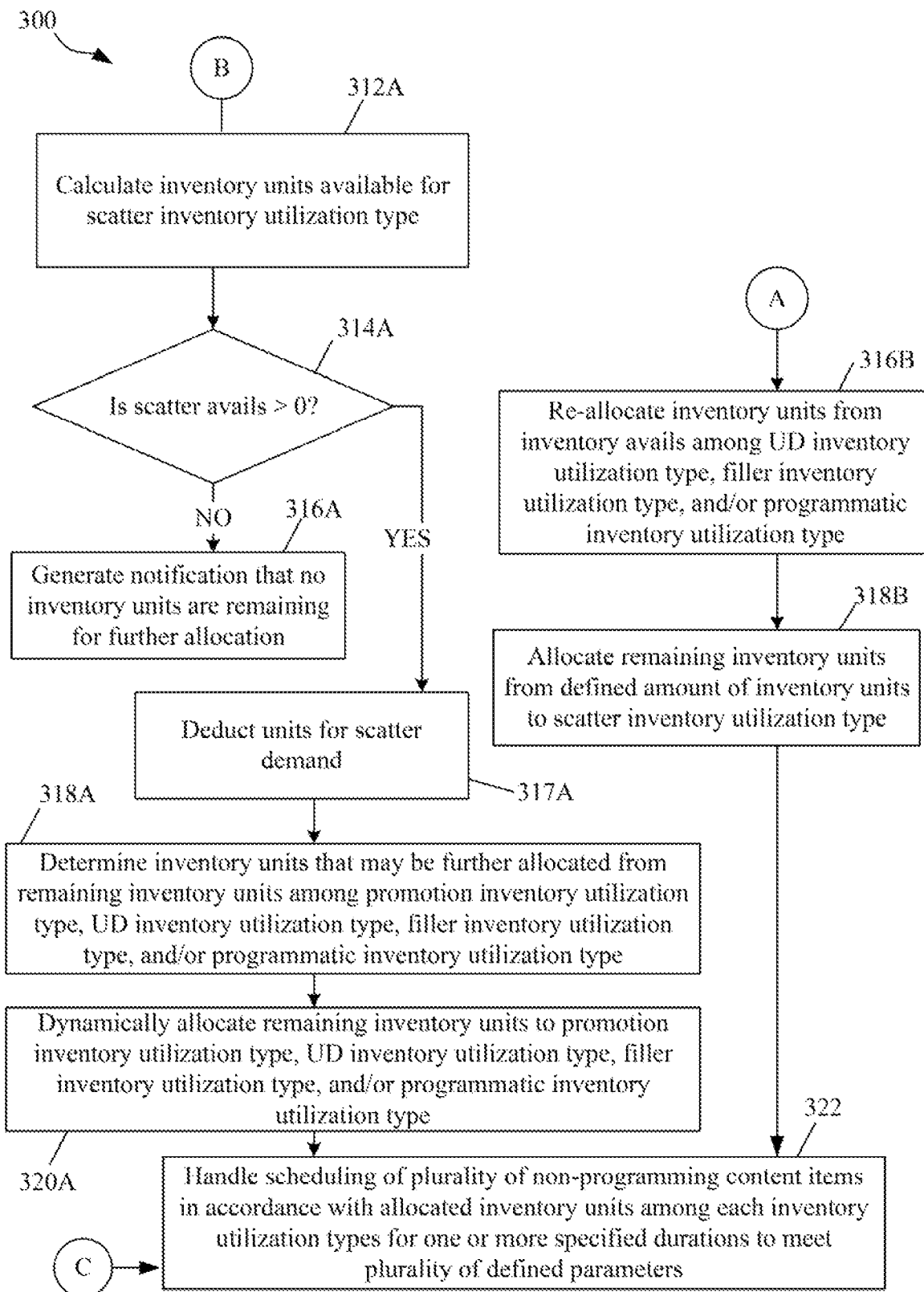

FIGS. 3A and 3B, collectively, depict a flow chart illustrating a high-level operation of the advertisement and promotion management system of FIG. 1B, in accordance with an exemplary embodiment of the disclosure. Referring to FIGS. 3A and 3B, there are shown a flow chart 300 comprising exemplary operations 302 through 318.

At 302, the SAIM 122 may receive input and/or parameters for each of the plurality of deals that corresponds to the upfront inventory utilization type 202 and the COB inventory utilization type 206. The input and/or parameters for each of the plurality of deals for a specified upcoming time-frame, such as quarter 4 (Q4) of a year, may be received from the deal information system 120.

At 304, reserve inventory units for each of the plurality of promotional campaigns that corresponds to the promotion inventory utilization type 204 of the plurality of inventory utilization types, may be determined for the specified upcoming time-frame. The promotion management system 114 that handles a plurality of promotional campaigns, may be configured to determine reserve inventory units required for each of the plurality of promotional campaigns for the specified upcoming time-frame. The reserve inventory units by week for the promotion inventory utilization type may also be referred to as promotion needs or promo needs. The reserve inventory units by week for the promotion inventory utilization type may be determined based on historical data of an amount of inventory units utilized previously under the promotion inventory utilization type 204 for the same specified upcoming time-frame, such as previous quarter. The historical data may be retrieved from the campaigns information system 128, which stores both historical and current information related to the promotional campaigns. The reserve inventory units for the promotion inventory utilization type 204 may also be determined based on a need of inventory units for the promotion as anticipated by the marketing user 134, and fed into the campaigns information system 128, via the user terminal 132. In a case, where inventory units requirement for the promotion inventory utilization type 204 is available from the promotion planning process when executed by the promotion planning system 130.

At 306, inventory units planning process for one or more specified durations until end of the specified upcoming time-frame, may be initiated. For example, the SAIM 122 may initiate weekly inventory planning for the next 13 weeks, at least two weeks prior to the start of the 1 week of the next 13 weeks, as shown and described in FIG. 4B.

At 308A, inventory units from a defined amount of inventory units may be deducted for the upfront inventory utilization type 202, the promotion inventory utilization type 204, and/or the COB inventory utilization type 206. The allocation may be executed by the SAIM 122 for the one or more specified durations (e.g. weekly) until end of the specified upcoming time-frame.

At 310A, minimum inventory units (or levels of inventory) for each of the UD inventory utilization type 210, the filler inventory utilization type 212, and/or the programmatic inventory utilization type 214, may be determined. Such minimum inventory units may be determined from available inventory units after inventory units are allocated among the upfront inventory utilization type 202, the COB inventory utilization type 206, and also initial allocation for the promotion inventory utilization type 204 (based on promo needs) is done.

At 312A, inventory units available for the scatter inventory utilization type 208 may be calculated. The inventory units available for the scatter inventory utilization type 208 may also be referred to as scatter avails. The scatter avails may correspond to the available inventory units after 310A is executed.

At 314A, it may be checked whether the inventory units available for the scatter inventory utilization type 208 is greater than zero (i.e. if scatter avails >0). In cases where the inventory units available for the scatter inventory utilization type 208 is greater than zero, the control passes to 317A, else to 316A.

At 316A, a notification may be generated that no inventory units are remaining for further allocation. The control may pass back to 314A to continuously or periodically check for a change in the availability of the inventory units for the scatter inventory utilization type 208.

At 317A, the units for scatter demand are deducted.

At 318A, inventory units that may be further allocated from the remaining inventory units among the promotion inventory utilization type 204, the UD inventory utilization type 210, the filler inventory utilization type 212, and/or the programmatic inventory utilization type 214, may be determined. The remaining inventory units may correspond to the inventory units available for the scatter inventory utilization type 208 (based on operation 312A). The number of inventory units to be allocated to each of the promotion inventory utilization type 204, the UD inventory utilization type 210, the filler inventory utilization type 212, and/or the programmatic inventory utilization type 214 is determined based on incremental value such that revenue from the UD inventory utilization type 210, the filler inventory utilization type 212, and/or the programmatic inventory utilization type 214 is optimized and at least ratings for inventory units assigned to the promotion inventory utilization type 204 may be increased using an optimization framework.

At 320A, the remaining inventory units from the defined amount of inventory units may then be dynamically allocated to the promotion inventory utilization type 204, the UD inventory utilization type 210, the filler inventory utilization type 212, and/or the programmatic inventory utilization type 214. The allocation may be executed by the SAIM 122 for the one or more specified durations until end of the specified upcoming time-frame. The control may then pass to operation 322, as shown in FIG. 3B.

Concurrent with the operation 308A, at 308B, the inventory units from the defined amount of inventory units may be deducted from the upfront inventory utilization type 202, the promotion inventory utilization type 204, and/or the COB inventory utilization type 206 for the first specified duration, for example, week 1 of the planned next 13 weeks. The allocation may be executed by the SAIM 122 for the next specified duration, for example, for the week 1 of the planned next 13 weeks, and at least 2 weeks prior to the start of the week 1 (shown by time-point 424 in FIG. 4B).

At 309B, a number of inventory units that were determined in the long term planning for each of the UD inventory utilization type 210, the filler inventory utilization type 212, and/or the programmatic inventory utilization type 214 required to fill up the remaining inventory units (e.g. inventory avails), may be deducted. The SAIM 122 may be configured to determine the number of inventory units for each of the UD inventory utilization type 210, the filler inventory utilization type 212, and/or the programmatic inventory utilization type 214, to compensate for the difference in the estimated demand value for inventory units for the first specified duration for the scatter inventory utilization type 208 and the current value of actual demand units for the scatter inventory utilization type 208 for the first specified duration using an optimization framework.

At 310B, it may be determined whether a current value of actual demand units for the scatter inventory utilization type 208 for the first specified duration (e.g. a first week) of the specified upcoming time-frame, for example, week 1 of the planned next 13 weeks, is less than the estimated demand value for inventory units for the first specified duration for the scatter inventory utilization type 208. Based on a determination that the current value of actual demand units for the scatter inventory utilization type 208 for the first specified duration is less than the estimated demand value for inventory units for the first specified duration for the scatter inventory utilization type 208, the control passes to 316B and if it is greater than, then control passes to 312B. In an event, the current value of actual demand units for the scatter inventory utilization type 208 for the first specified duration is equal to the estimated demand value for inventory units for the first specified duration for the scatter inventory utilization type 208, the control passes to 322.

At 312B, it may be determined which consumed inventory units must be recouped in order to meet inventory limitations.

At 316B, inventory units from inventory avails may be re-allocated among the UD inventory utilization type 210, the filler inventory utilization type 212, and/or the programmatic inventory utilization type 214. The re-allocation may be executed by the SAIM 122 for the first specified duration based on the determined number of inventory units for each of the UD inventory utilization type 210, the filler inventory utilization type 212, and/or the programmatic inventory utilization type 214 using the optimization model. Similar to first specified duration, the inventory unit mix adjustment for re-allocation may be executed by the SAIM 122 for the one or more consecutive specified durations until end of the specified upcoming time-frame.

At 318B, the remaining inventory units from the defined amount of inventory units may be allocated to the scatter inventory utilization type 208. The allocation may be executed by the SAIM 122 for the first specified duration.

At 322, the scheduler 126 may be configured to handle scheduling of a plurality of non-programming content items in accordance with the allocated inventory units among each inventory utilization types for the one or more specified durations to meet a plurality of defined parameters, for example, multiple objectives. The plurality of defined parameters corresponds to maximization of a revenue parameter for a certain amount of available inventory units that corresponds to aggregate capacity of non-programming airtime, as well as minimization of a total penalty that may arise from deviations of obligatory target values specified in the deals for advertisers and/or promotional campaigns. In accordance with an embodiment, the plurality of defined parameters corresponds to maximization of a rating parameter for at least the promotion inventory utilization type 204 and the revenue parameter for other inventory utilization types for the defined amount of inventory units.

Figure 4A:
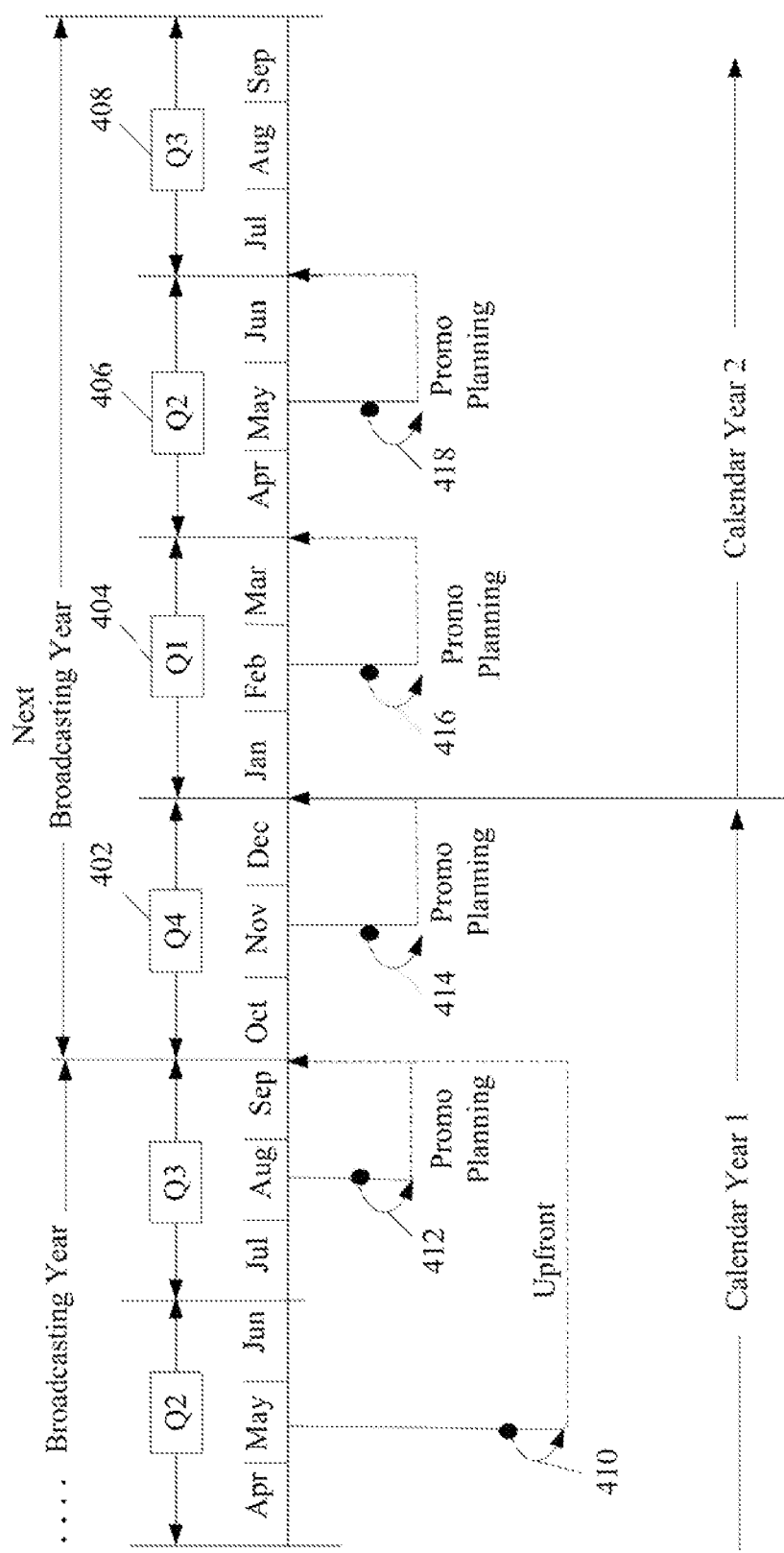
FIG. 4A illustrates exemplary broadcast years to depict initiation of an inventory planning process for managing allocation of inventory mix utilizing an optimization framework, in accordance with an exemplary embodiment of the disclosure.

FIG. 4A illustrates broadcast years to depict initiation of an inventory planning process for managing allocation of inventory mix utilizing an optimization framework, in accordance with an exemplary embodiment of the disclosure. Referring to FIG. 4A, there is shown a planning horizon of a broadcast year, starting from fourth quarter (Q4) 402, followed by first quarter (Q1) 404, second quarter (Q2) 406, and third quarter (Q3) 408. There is also shown various events 410 to 418 in the two broadcastings years, as shown in the planning horizon. It should be noted that although the broadcast period is illustrated in years, the disclosure is not limited in this regard, and other suitable periods may be utilized without departing from the spirit and scope of the disclosure.

The event 410 corresponds to the upfront market, which usually occurs around mid-May in Q2 of a broadcast year, where the network providers typically announce their programming schedules for the next broadcast year (or a broadcast season of a calendar year 1) that starts in late September/early October in Q4 402, as shown.

The events 412 to 418 correspond to start of the promotion planning process. The promotion planning process may be initiated by the promotion planning system 130 for each quarter of a broadcast year before the end of the previous quarter. For example, promotion planning for Q4 402 may be initiated, for example, 6 weeks prior to start of the Q4, as shown by the event 412. Similarly, promotion planning for Q1 404 may be initiated at the end of the Q4 402, such as 6 weeks prior to start of the Q1 404, as shown by the event 414. The events 416 and 418 depict promotion planning for Q2 406 and Q3 408 at the end of the Q1 404 and Q2 406 respectively, as shown.

In accordance with an embodiment, in the initial promotion planning process at the event 412 (for example, 6 weeks prior to start of a new quarter (FIG. 4A), the promotion management system 114 may be configured to determine reserve inventory units by week required for each of the plurality of promotional campaigns that corresponds to the promotion inventory utilization type 204 for the specified upcoming time-frame, for example, for 13 weeks upcoming time-frame 420A from the start of the Q4 402. Thus, at this time point that corresponds to the event 412, the initial decisioning related to the amount of inventory units to be assigned to the promotion inventory utilization type 204 based on the determined reserve (promotion needs), the upfront inventory utilization type 202, the COB inventory utilization type 206 for the specified upcoming time-frame, such as the 13 weeks upcoming time-frame 420A, may already be determined and available with the SAIM 122. The reserve inventory units by week for the promotion inventory utilization type 204 may be determined based on historical data of an amount of inventory units utilized previously under the promotion inventory utilization type 204 for the same specified upcoming time-frame, such as quarter 4 of previous year. The historical data may be retrieved from the campaigns information system 128, which stores both historical and current information related to the promotional campaigns. The reserve inventory units for the promotion inventory utilization type 204 may also be determined based on a need of inventory units for the promotion as anticipated by the marketing user 134, and fed into the campaigns information system 128, via the user terminal 132.

Figure 4B:
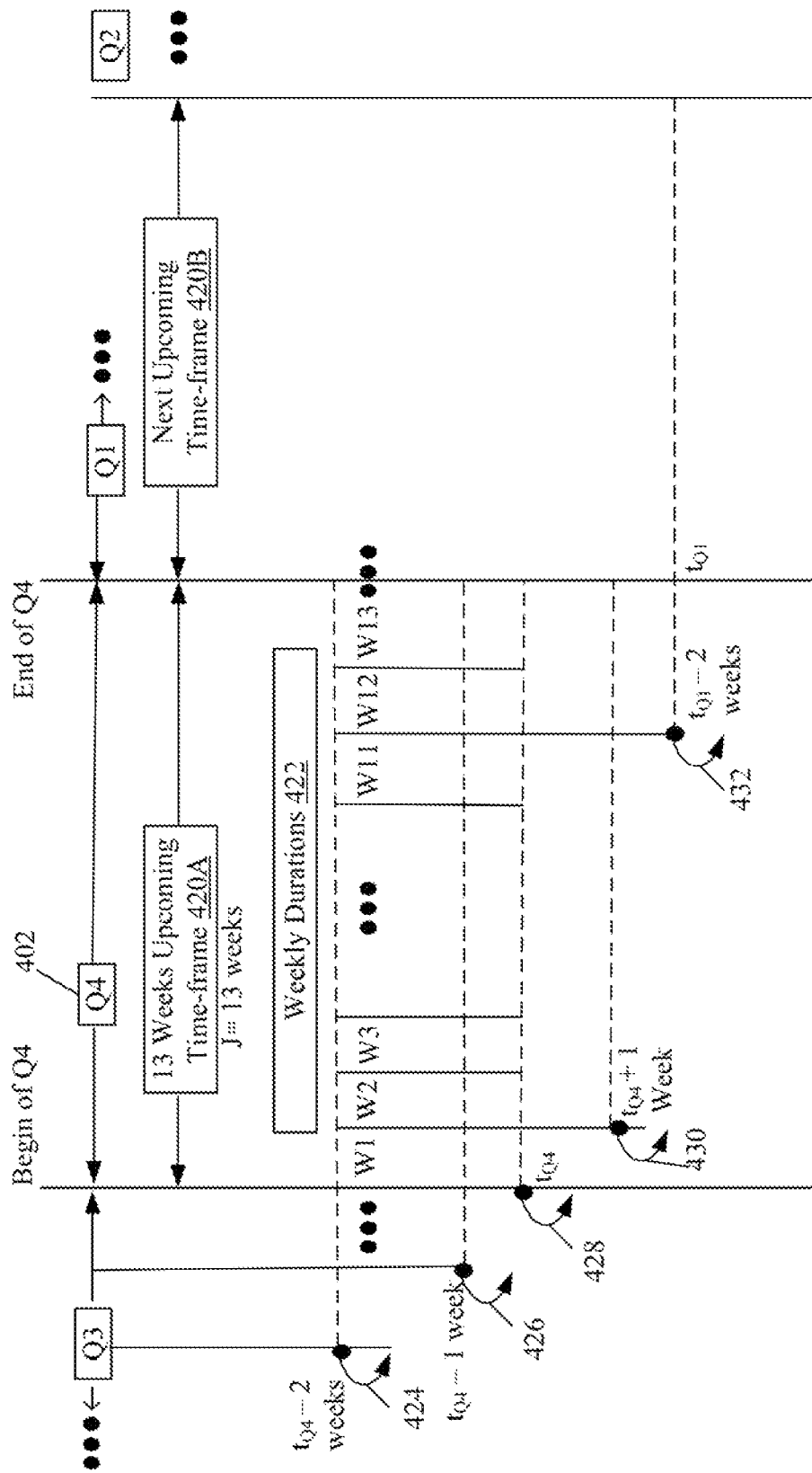
FIG. 4B illustrates a weekly inventory planning process for a specified upcoming time-frame for managing allocation of inventory mix utilizing an optimization framework, in accordance with an exemplary embodiment of the disclosure.

FIG. 4B illustrates exemplary quarterly and weekly inventory planning process for a specified upcoming time-frame for managing allocation of inventory mix utilizing an optimization framework, in accordance with an exemplary embodiment of the disclosure. FIG. 4B is described in conjunction with elements from FIG. 4A. Referring to FIG. 4B, there is further shown quarterly inventory determinations and allocations, such as a 13 weeks upcoming time-frame 420A and a next upcoming time-frame 420B. The 13 weeks upcoming time-frame 420A and the next upcoming time-frame 420B are examples of the specified upcoming time-frame or long term quarterly planning for different inventory utilization types. There is also shown weekly durations 422, such as week 1 to 13 of the 13 weeks upcoming time-frame 420A. The weekly durations 422 is shown to describe weekly or short-term adjustments of the different inventory utilization types on rolling basis until the end of the specified upcoming time-frame. The weekly durations 422 is an example of the one or more specified durations, where each specified duration (e.g. either one, two, or three weeks duration) is shorter than the specified upcoming time-frame, such as the 13 weeks upcoming time-frame 420A. There is also shown time-points 424 to 432, which represents certain decisioning, allocation, and re-allocation of inventory mix at certain time-points of a broadcasting year, such as 1 or 2 weeks before the start of a new quarter, or after certain week(s) has/have passed after a start of a quarter.

In accordance with an embodiment, at time-point 424 (i.e. "$t_{Q4}-2$ weeks"), the SAIM 122 may initiate weekly inventory planning for the next quarter, such as Q4 402 at least two weeks prior to the start of the Q4 402 (i.e. if time "t"=begin of Q4 402, then at "$t_{Q4}-2$ weeks" (or at the end of $11^{th}$ week of the quarter 3 (Q3)), such weekly inventory planning for the Q4 402 may be initiated, as shown. At time-point 424, based on current scatter demand and inventory avails, the SAIM 122 may dynamically allocate inventory units from the defined amount of inventory units (e.g. from inventory avails) among each inventory utilization types of the plurality of inventory utilization types to meet multiple objectives, such as the plurality of defined parameters, for the weekly durations 422 until end of the 13 week upcoming time-frame 420A. As the time progresses, and with regards to the short-term planning and adjustments, the SAIM 122 may periodically adjust and re-distribute the previously allocated inventory units among each inventory utilization types of the plurality of inventory utilization types to meet multiple objectives. For example, based on a determination that the current value of actual demand units for the scatter inventory utilization type 208 for the first specified duration, such as "W1" of the 13 weeks upcoming time-frame 420A, is less or more than the estimated demand value for inventory units for the first specified duration for the scatter inventory utilization type 208, further inventory units adjustment and re-allocation among different inventory utilization types, may be done. The short term weekly planning and adjustments for allocation of inventory mix is described in FIGS. 3A and 3B, with reference to operations 310B to 318B. For example, at time-point 426 (i.e. $t_{Q4}-1$ week), there may be a change in the previously estimated demand value and actual value of actual demand units for the scatter inventory utilization type 208 for the first specified duration, such as "W1" of the 13 weeks upcoming time-frame 420A. Thus, based on such changes in the previously estimated demand value and actual value of actual demand units, the SAIM 122 may be configured to re-allocate the determined number of inventory units among different inventory utilization types, using the optimization model. Similar to short term weekly planning and adjustments for allocation of inventory mix at time-point 426, the SAIM 122 may be configured to periodically execute weekly inventory units adjustment and re-allocation among different inventory utilization types for each of the weekly durations 422 (for example, at time-point 428 ($t$) and time-point 430 (i.e. $t_{Q4}+1$ week), within the Q4 402 until end of the 13 weeks upcoming time-frame 420A.

In accordance with an embodiment, similar to the operation executed at time-point 424, the SAIM 122 may initiate weekly inventory planning for the next quarter, such as quarter 1 (Q1) at least two weeks prior to the start of the Q1 (i.e. at "$t_{Q1}-2$ weeks" (or at the end of $11^{th}$ week of the Q4 402, as shown. At time-point 432, based on current scatter demand and inventory avails, the SAIM 122 may then dynamically allocate inventory units from the defined amount of inventory units (e.g. from remaining inventory avails) among each inventory utilization types of the plurality of inventory utilization types to meet multiple objectives, such as the plurality of defined parameters, for weekly durations until end of the next upcoming time-frame 420B. Thus, this process of quarterly inventory determinations and allocations may begin 2 weeks prior to start of every quarter, and short-term adjustments may be done within each quarter until the end of the respective quarter. The various operations executed by the SAIM 122 of the advertisement and promotion management system 102, may be further understood from the flowchart of FIGS. 5A and 5B.

Figure 5A:
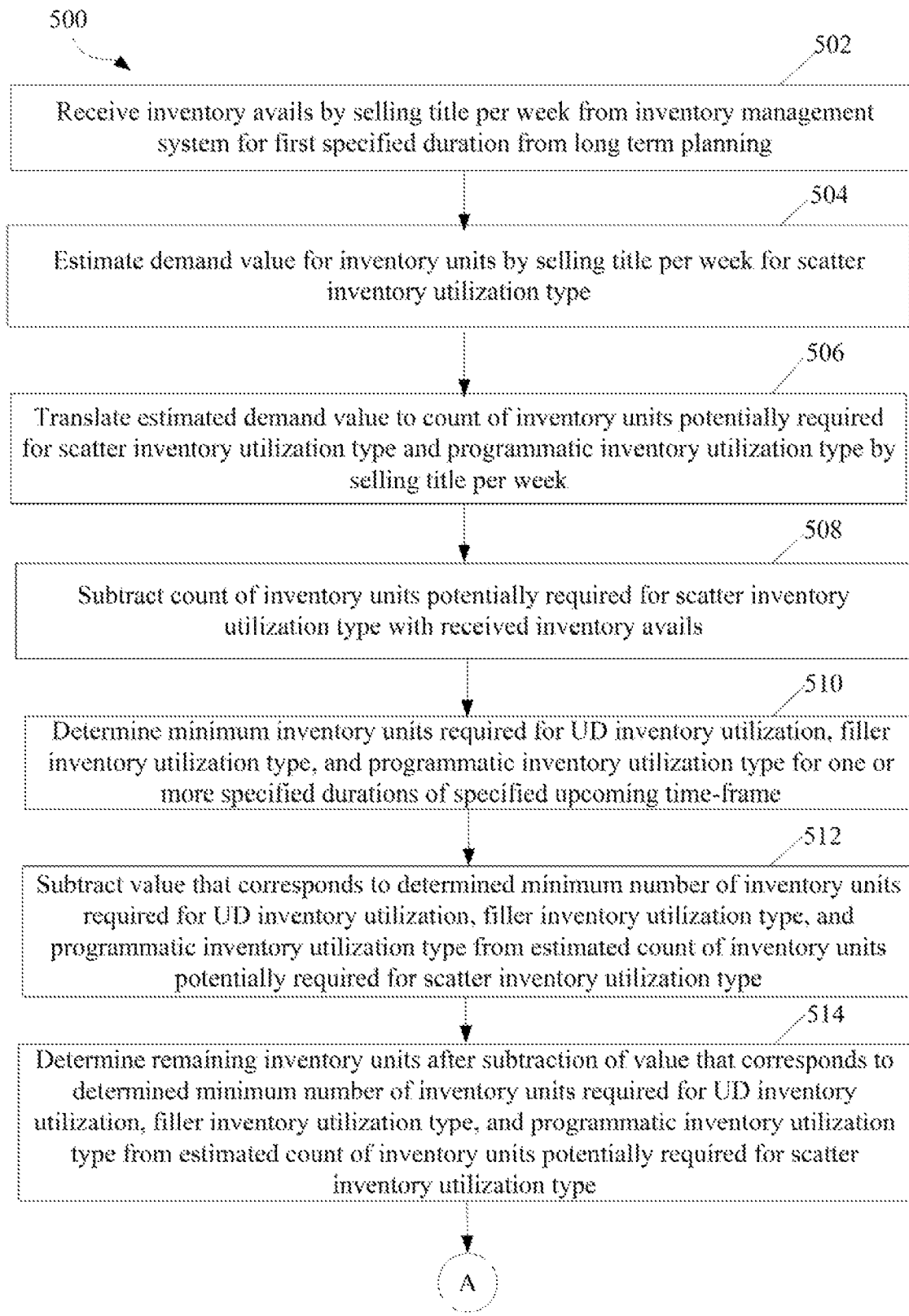
FIGS. 5A and 5B, collectively, depict a flow chart illustrating exemplary operations for managing allocation of inventory mix utilizing an optimization framework in the advertisement and promotion management system, in accordance with an exemplary embodiment of the disclosure.
Figure 5B:
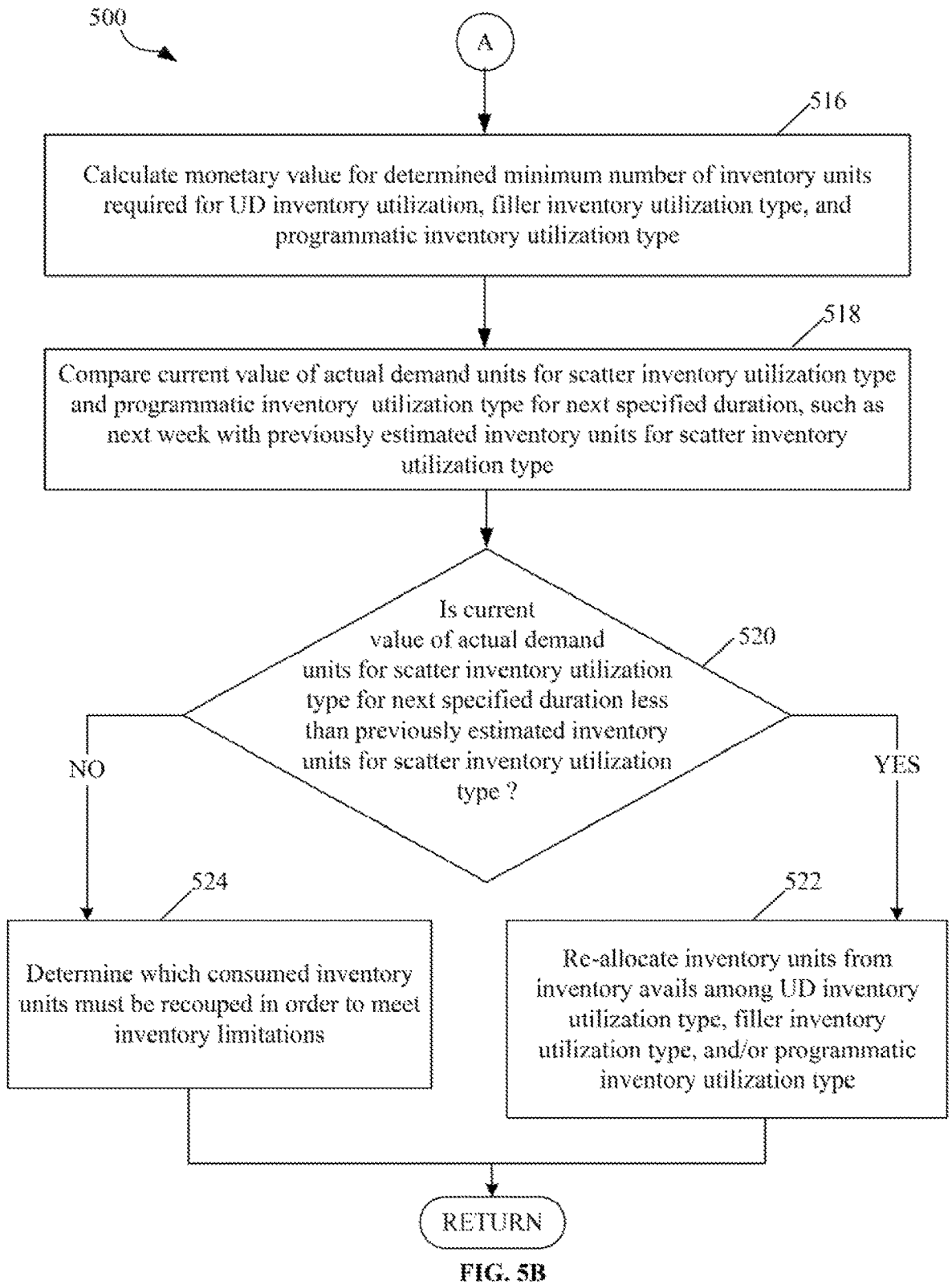

FIGS. 5A and 5B, collectively depict a flow chart illustrating exemplary operations for managing allocation of inventory mix utilizing an optimization framework in the advertisement and promotion management system, in accordance with an exemplary embodiment of the disclosure. Referring to FIGS. 5A and 5B, there are shown a flow chart 500 comprising exemplary operations 500 through 524. At 502, the SAIM 122 may receive inventory avails by selling title per week from the inventory management system 116 for the first specified duration, such as W1 of the 13 weeks upcoming time-frame 420A. The inventory avails corresponds to inventory units remaining after allocation to the upfront inventory utilization type 202, the promotion inventory utilization type 204, and the COB inventory utilization type 206. This operation 502 may start at time-point 424, which represents 2 weeks prior to the start of week 1 (the first specified duration) of the 13 weeks upcoming time-frame 420A. At 504, the SAIM 122 may be configured to estimate a demand value for inventory units by selling title per week (i.e. W1, W2, . . . W13) for the scatter inventory utilization type 208. Although FIG. 5A and FIG. 5B described using selling title per week, the disclosure is not limited in this regard and other duration and/or metrics (e.g. actual units) may be utilized without departing from the various embodiments of the disclosure.

At 506, the estimated demand value may be translated to a count of inventory units potentially required for the scatter inventory utilization type 208 and the programmatic inventory utilization type 214 by selling title per week. At 508, the count of inventory units potentially required for the scatter inventory utilization type 208 may be subtracted with the received inventory avails.

At 510, minimum inventory units required for the UD inventory utilization type 210, the filler inventory utilization type 212, and the programmatic inventory utilization type 214 for the one or more specified durations of the specified upcoming time-frame, may be determined. The SAIM 122 may determine the minimum inventory units required for the UD inventory utilization type 210 to proactively meet a scenario of under delivering by the plurality of deals to attain lower targets while honoring corresponding deal constraints. At 512, a value that corresponds to the determined minimum number of inventory units required for the UD inventory utilization type 210, the filler inventory utilization type 212, and the programmatic inventory utilization type 214 may be subtracted from the estimated count of inventory units potentially required for the scatter inventory utilization type 208.

At 514, remaining inventory units after subtraction of the value that corresponds to the determined minimum number of inventory units required for the UD inventory utilization type 210, the filler inventory utilization type 212, and the programmatic inventory utilization type 214, from the estimated count of inventory units potentially required for the scatter inventory utilization type 208, may be determined. At step 516, a monetary value for the determined minimum number of inventory units required for the UD inventory utilization type 210, the filler inventory utilization type 212, and the programmatic inventory utilization type 214 may be calculated. The monetary value for the programmatic inventory utilization type 214 may be calculated at least based on the determined remaining inventory units.

At 518, a current value of actual demand units for the scatter inventory utilization type 208 and the programmatic inventory utilization type 214 for next specified duration, such as next week, is compared with a previously estimated (such as a forecast) inventory units for the scatter inventory utilization type 208. At 520, it may be determined whether the current value of the actual demand units for the scatter inventory utilization type 208 for the next specified duration is less than the previously estimated (such as a forecast) inventory units for the scatter inventory utilization type 208 for the next specified duration. In an event, the current value of the actual demand units for the scatter inventory utilization type 208 is less than the previously estimated inventory units for the scatter inventory utilization type 208 for the next specified duration, the control passes to 522, else to 524.

At 522, inventory units from inventory avails may be re-allocated among the UD inventory utilization type 210, the filler inventory utilization type 212, and/or the programmatic inventory utilization type 214. The re-allocation may be executed by the SAIM 122 for the first specified duration, such as week 1, based on the calculated monetary value using the inventory mix optimization framework. At 524, it may be determined which consumed inventory units must be recouped in order to meet inventory limitations. The control may then return to 502 to repeat the process for week 2 to week 13 until end of the specified upcoming time-frame, such as the 13 weeks upcoming time-frame 420A (as shown in FIG. 4B). Thus, for each week, a different amount of inventory units may be allocated for each inventory utilization types based on the operations 502 to 522 using the inventory mix optimization framework similar to the re-allocation for the first specified duration, such as "W1". Thus, for each week of the specified upcoming time-frames, such as the 13 weeks upcoming time-frame 420A and the next upcoming time-frame 420B, there may be a different pie chart that represents the proportion of the allocated inventory units to each of the plurality of the inventory utilization types.

Figure 5C:
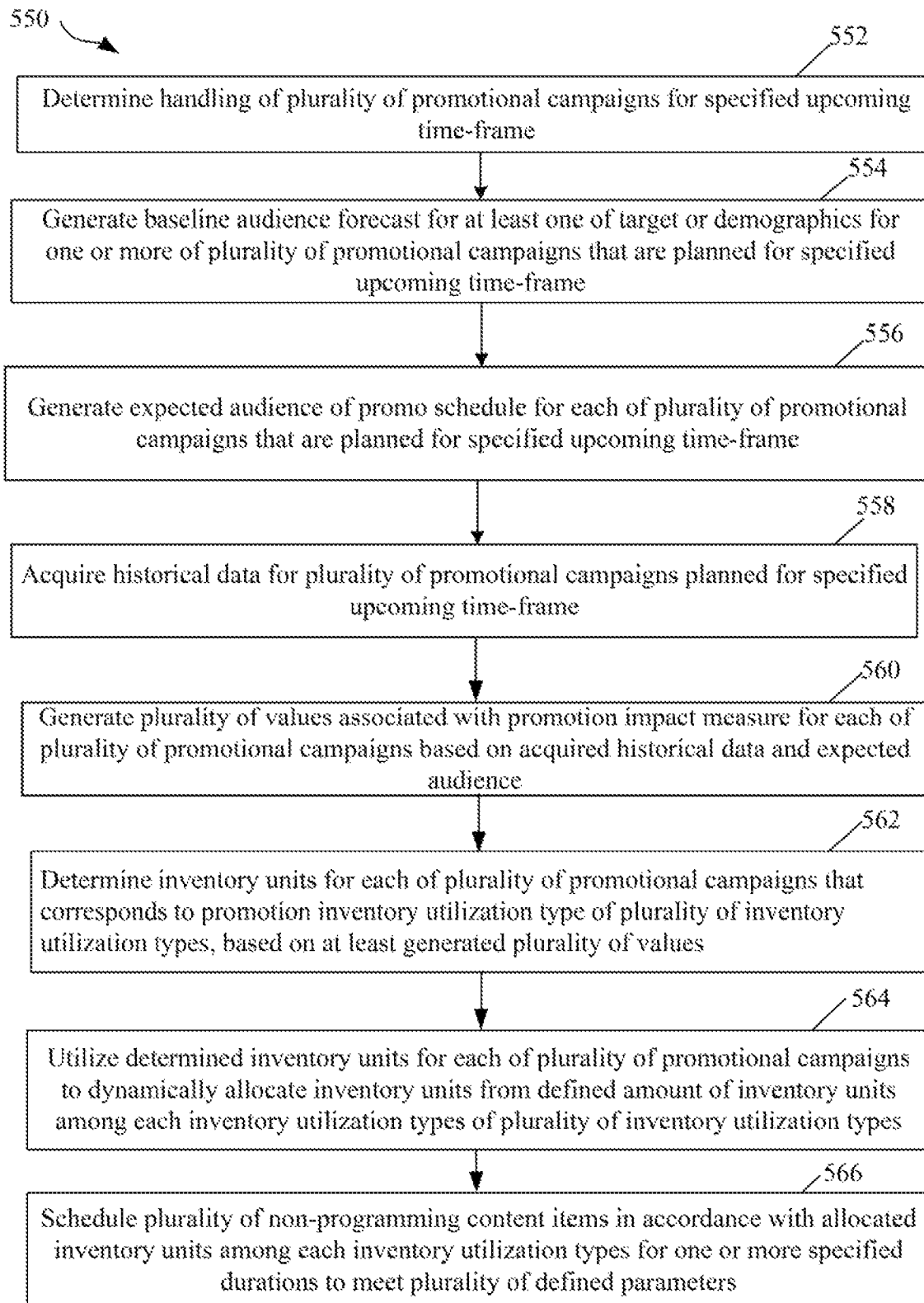
FIG. 5C is a flow chart illustrating exemplary operations for a promotion planning process to determine inventory required for promotion inventory utilization type for managing allocation of inventory mix in the advertisement and promotion management system, in accordance with an exemplary embodiment of the disclosure.

FIG. 5C is a flow chart illustrating exemplary operations for a promotion planning process to determine inventory required for promotion inventory utilization type for managing allocation of inventory mix in the advertisement and promotion management system, in accordance with an exemplary embodiment of the disclosure. Referring to FIG. 5C, there are shown a flow chart 552 comprising exemplary operations 552 through 566.

At 552, the promotion management system 114 may determine handling of a plurality of promotional campaigns for a specified (or next) upcoming time-frame.

At 554, the promotion planning system 130 may be configured to generate a baseline audience forecast for at least one of a target or demographics for one or more of the plurality of promotional campaigns that are planned for the specified upcoming time-frame. The baseline audience forecast may include audience rating estimates, lead-in audience estimates, and/or other research-based forecasts. The baseline audience forecast may be stored in the estimate database 124. U.S. application Ser. No. 14/842,817, which was filed on Sep. 1, 2015, entitled "programming optimization utilizing a framework for audience rating estimation," discloses, for example, a television program scheduling system that receives historical audience data for previous telecasts of the shows on one or more television networks, calibrates a model for audience rating estimation based on the historical audience data, utilizes the calibrated model for audience rating estimation to generate estimates or projections of audience in the future. U.S. application Ser. No. 14/842,808, which was filed on Sep. 1, 2015, entitled "targeting and demographics scheduling utilizing a framework for audience rating estimation," discloses, for example, an advertisement management system that generates audience rating estimated by demographics and/or by target.

At 556, the promotion planning system 130 may generate an expected audience of a promo schedule for each of the plurality of promotional campaigns that are planned for the specified upcoming time-frame.

At 558, the promotion planning system 130 may acquire historical data for the plurality of promotional campaigns planned for the specified upcoming time-frame. In accordance with an embodiment, the promotion planning system 130 may further acquire historical viewership data for airings of a television show similar to that of another television show that is to be promoted when there is no prior historical data, and/or for defined number of weeks prior to a date of planning of the plurality of promotional campaigns for the specified upcoming time-frame for the determination of the amount of inventory units required for one or more of the plurality of promotional campaigns.

At 560, the promotion planning system 130 may generate a plurality of values associated with a promotion impact measure for each of the plurality of promotional campaigns based on the acquired historical data and the expected audience. The plurality of values associated with the promotion impact measure may correspond to the GRP goals resulting from the expected estimation from the exemplary estimation model. In this regard, the goals may be informed by the size of the audience they want for the show and what they can achieve given the inventory availability.

At 562, the promotion planning system 130 may determine inventory units for each of the plurality of promotional campaigns that corresponds to the promotion inventory utilization type 204 of the plurality of inventory utilization types, based on at least the generated plurality of values.

At 564, the SAIM 122 may utilize the determined inventory units for each of the plurality of promotional campaigns to dynamically allocate inventory units from a defined amount of inventory units among each inventory utilization types of the plurality of inventory utilization types. The dynamic allocation is done to meet a plurality of defined parameters for the defined amount of inventory units for one or more specified durations until an end of the specified upcoming time-frame.

At 566, the scheduler 126 may schedule a plurality of non-programming content items in accordance with the allocated inventory units among the each inventory utilization types for the one or more specified durations to meet the plurality of defined parameters. The plurality of defined parameters corresponds to maximization of a rating parameter and a revenue parameter for the defined amount of inventory units and minimization of a total penalty from deviations of obligatory target values arising from the plurality of deals for the plurality of advertisers and/or the plurality of promotional campaigns.

Figure 6:
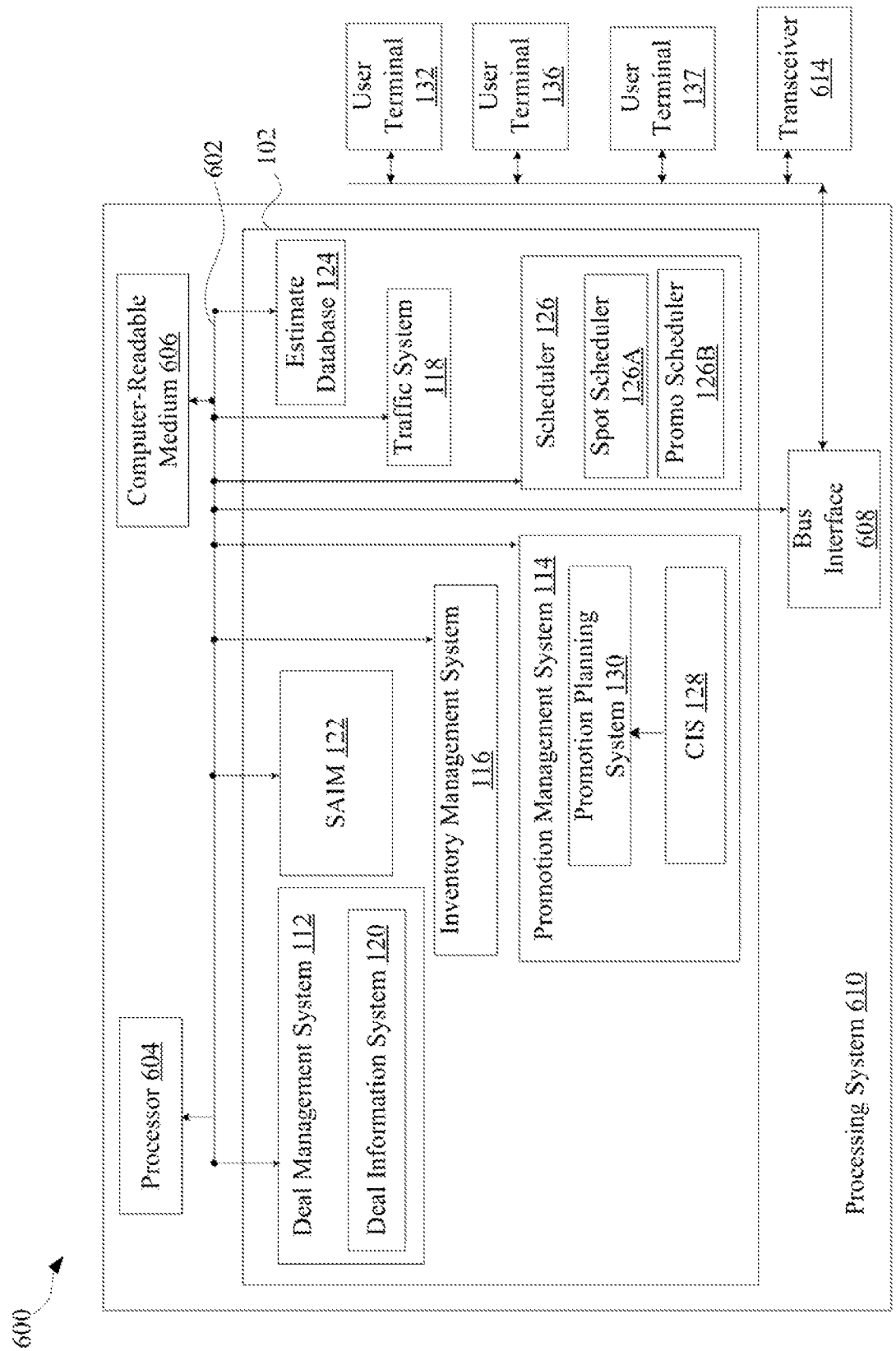
FIG. 6 is a conceptual diagram illustrating an example of a hardware implementation for an advertisement and promotion management system employing a processing system for generating an optimal allocation of inventory mix, in accordance with an exemplary embodiment of the disclosure.

FIG. 6 is a conceptual diagram illustrating an example of a hardware implementation for an advertisement and promotion management system employing a processing system for generating an optimal allocation of inventory mix, in accordance with an exemplary embodiment of the disclosure. Referring to FIG. 6, the hardware implementation shown by a representation 600 for the advertisement and promotion management system 102 employs a processing system 602 for generating an optimal allocation of under delivery units across a plurality of deals, in accordance with an exemplary embodiment of the disclosure, as described herein. In some examples, the processing system 602 may comprise one or more hardware processors 604, a non-transitory computer-readable medium 606, a hardware deal management system 112, a hardware promotion management system 114, a hardware inventory management system 116, a hardware traffic system 118, and a hardware SAIM 122. The hardware deal management system 112 may comprise a hardware deal information system 120. The hardware promotion management system 114 may comprise a hardware campaigns information system 128 and a hardware promotion planning system 130. The processing system 602 may also include a scheduler 126. In some embodiments, the scheduler 126 may comprise a spot scheduler 126A and a promo scheduler 126B.

In this example, the advertisement and promotion management system 102 employing the processing system 602 may be implemented with a bus architecture, represented generally by bus 608. The bus 608 may include any number of interconnecting buses and bridges depending on the specific implementation of the advertisement and promotion management system 102 and the overall design constraints.

The bus 608 links together various circuits including the one or more processors, represented generally by the processor 604, the non-transitory computer-readable media, represented generally by the computer-readable medium 606, the hardware deal management system 112, the hardware promotion management system 114, the hardware inventory management system 116, the hardware traffic system 118, the hardware deal information system 120, the hardware SAIM 122, the scheduler 126, the hardware campaigns information system 128, and the hardware promotion planning system 130 which may be configured to carry out one or more operations or methods described herein. A bus interface 610 provides an interface between the bus 608 and a transceiver 612. The transceiver 612 provides a means for communicating via the network 108 with various other apparatus, such as the advertiser order generation systems 106a, ..., 106n, and the consumer devices 110a, ..., 110n.

The user terminals 132 and 136 may comprise a keypad, display, speaker, microphone, pointing to enable a user, such as the marketing user 134 and the sales user 138 to interact with the advertisement and promotion management system 102. The user terminal 132 may be configured to present a user interface that enables the marketing user 134, such as a promotion planner to configure and interact with components such as the campaigns information system 128. Similarly, the user terminal 136 may be configured to present another user interface that enables the sales user 138, such as a deal handler, to configure and interact with components such as the deal information system 120. The user terminal 137 may be configured to present a user interface that enables user 139 to provide information such as user priorities and objectives to the SAIM 122.

The processor 604 may be configured to manage the bus 608 and general processing, including the execution of a set of instructions stored on the computer-readable medium 606. The set of instructions, when executed by the processor 604, causes the advertisement and promotion management system 102 to execute the various functions described herein for any particular apparatus. The computer-readable medium 606 may also be used for storing data that is manipulated by the processor 604 when executing the set of instructions. The computer-readable medium 606 may also be configured to store data for one or more of the hardware traffic system 118, the hardware deal management system 112, the hardware inventory management system 116, the hardware deal information system 120, the hardware SAIM 122, the hardware campaigns information system 128, the scheduler 126, and/or the hardware promotion planning system 130.

In an aspect of the disclosure, the processor 604, the computer-readable medium 606, or a combination of both may be configured or otherwise specially programmed to execute the operations or functionality of the hardware deal management system 112, the hardware promotion management system 114, the hardware inventory management system 116, the hardware traffic system 118, the hardware deal information system 120, the hardware SAIM 122, the scheduler 126, the hardware campaigns information system 128, and the hardware promotion planning system 130, or various other components described herein. For example, processor 604, computer-readable medium 606, or a combination of both may be configured or otherwise specially programmed to perform the operations and functionality of the hardware deal management system 112, the hardware promotion management system 114, the hardware inventory management system 116, the hardware traffic system 118, the hardware deal information system 120, the hardware SAIM 122, the hardware or software-based scheduler 126, the hardware campaigns information system 128, and the hardware promotion planning system 130 as described with respect to FIGS. 1A, 1B, 2, 3, 4A, 4B, 5A, 5B, and 5C.

Various embodiments of the disclosure comprise an advertising and promotion management system 102 that may be configured to handle a plurality of deals for a plurality of advertisers and a plurality of promotional campaigns. The advertising and promotion management system 102 may comprise, for example, the deal management system 112, the promotion management system 114, the inventory management system 116, the traffic system 118, the SAIM 122, and the scheduler 126. The deal management system 112 may comprise the deal information system 120. The promotion management system 114 may comprise the campaigns information system 128 and the promotion planning system 130. The SAIM 122 may be configured to receive input and/or parameters for each of the plurality of deals that corresponds to the upfront inventory utilization type 202 of the plurality of inventory utilization types, from the deal information system 120. The promotion management system 114 may be configured to determine reserve inventory units for each of the plurality of promotional campaigns that corresponds to the promotion inventory utilization type 204 and the COB inventory utilization type 206, of the plurality of inventory utilization types for a specified upcoming time-frame, such as the specified upcoming time-frame. The SAIM 122 may be configured to dynamically allocate inventory units from a defined amount of inventory units among each inventory utilization types of the plurality of inventory utilization types to meet the plurality of defined parameters for the defined amount of inventory units for one or more specified durations (such as one or more weeks) until end of the specified upcoming time-frame.

The plurality of defined parameters corresponds to maximization of a revenue parameter for the defined amount of inventory units and minimization of a total penalty from deviations of obligatory target values arising from the plurality of deals for the plurality of advertisers and/or the plurality of promotional campaigns. The plurality of inventory utilization types, which consume different portions of the defined amount of inventory units based on the allocation of the inventory units, include the scatter inventory utilization type 208, the UD inventory utilization type 210, the filler inventory utilization type 212, and/or the programmatic inventory utilization type 214 in addition to the upfront inventory utilization type 202, the COB inventory utilization type 206, and the promotion inventory utilization type 204.

The promotion management system 114 may determine handling of a plurality of promotional campaigns for a specified upcoming time-frame. The promotion planning system 130 may also generate an expected audience of a promo schedule for each of the plurality of promotional campaigns that are planned for the specified upcoming time-frame. In accordance with an embodiment, the promotion planning system 130 may acquire historical data for the plurality of promotional campaigns planned for the specified upcoming time-frame. The promotion planning system 130 may generate a plurality of values associated with a promotion impact measure for each of the plurality of promotional campaigns based on the acquired historical data and the expected audience. The promotion planning system 130 may determine inventory units for each of the plurality of promotional campaigns that corresponds to the promotion inventory utilization type 204 of the plurality of inventory utilization types, based on at least the generated plurality of values. In accordance with an embodiment, the SAIM 122 may utilize the determined inventory units for each of the plurality of promotional campaigns to dynamically allocate inventory units from a defined amount of inventory units among each inventory utilization types of the plurality of inventory utilization types. The dynamic allocation is done to meet a plurality of defined parameters for the defined amount of inventory units for one or more specified durations until an end of the specified upcoming time-frame.

The promotion planning system 130 may also determine reserve inventory units for each of the plurality of promotional campaigns that corresponds to the promotion inventory utilization type for the specified upcoming time-frame. In accordance with an embodiment, the promotion planning system 130 may further acquire historical viewership data for airings of a television show similar to that of another television show that is to be promoted when there is no prior historical data, and/or for defined number of weeks prior to a date of planning of the plurality of promotional campaigns for the specified upcoming time-frame for the determination of the amount of inventory units required for one or more of the plurality of promotional campaigns. The promotion planning system 130 may be configured to generate a baseline audience forecast for at least one of a target or demographics for one or more of the plurality of promotional campaigns that are planned for the specified upcoming time-frame. The baseline audience forecast may include audience rating estimates, a lead-in audience estimate, and/or other research-based forecast.

The SAIM 122 provides significant productivity and efficiency improvements since the process of allocating inventory units across hundreds of deals and promotional campaigns has been reduced from weeks to minutes. Since the SAIM 122 continually receives input from the deal information system 120 and the promotion management system 114, inventory units from a defined amount of inventory units are dynamically allocated, for example for future weeks, among each inventory utilization types to meet multiple objectives at the same time. For example, ratings, such as GRP or actual audience achieved, and revenue from the defined amount of inventory units are maximized, whereas a total penalty from deviations of obligatory target values arising from the hundreds of deals and promotional campaigns, are minimized.

Thus, the SAIM 122 enables the advertising and promotion management system 102 to operate more efficiently and optimally providing both an economic and a cost advantage. Further, when the SAIM 122 generates an optimal allocation of inventory units for different inventory utilization types, the allocation solution may be generated utilizing less memory than would otherwise be required resulting in much faster processing time (faster computation time without sacrificing accuracy). This enables a faster and timely allocations of the inventory avails, and the results of a selected allocation may be propagated in a much faster manner to other hardware components in the advertisement and promotion management system 102 to more efficiently and quickly schedule the spots in accordance with the allocation of the inventory units. The ability to quickly compute optimal allocation solutions for a given set of parameters may free up valuable processing resources such as memory and computing power, which may be utilized when the SAIM 122 processes optimal allocation solutions for the plurality of inventory utilization types.

The word "exemplary" is used herein to mean "serving as an example, instance, or illustration." Any embodiment described herein as "exemplary" is not necessarily to be construed as preferred or advantageous over other embodiments. Likewise, the term "embodiments of the disclosure" does not require that all embodiments of the disclosure include the discussed feature, advantage or mode of operation.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program or instructions having at least one code section executable by a machine and/or a computer, thereby causing the machine and/or computer to perform the steps as described herein for promotion planning for managing allocation of inventory mix utilizing an optimization framework.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A method, comprising:
   in a media management system that handles a plurality of agreement information for a plurality of promotional campaigns:
   generating, by a processor, a plurality of values associated with a promotion impact measure for each of the plurality of promotional campaigns based on historical data and an expected audience,
   wherein the plurality of promotional campaigns is planned for a specified upcoming time-frame, and
   wherein the historical data indicates an amount of inventory units utilized previously under a promotion inventory utilization type for the specified upcoming time-frame;
   determining, by the processor, a gross sum of the plurality of values associated with the promotion impact measure for each of the plurality of promotional campaigns for a defined number of weeks of each of the plurality of promotional campaigns;
   determining, by the processor, a number of inventory units for each of the plurality of promotional campaigns that corresponds to the promotion inventory utilization type of a plurality of inventory utilization types, based on a difference in an estimated demand value for the inventory units for a specified duration for a scatter inventory utilization type of the plurality of inventory utilization types and a current value of actual demand units for the scatter inventory utilization type for the specified duration and at least the gross sum of the plurality of values associated with the promotion impact measure for each of the plurality of promotional campaigns for the defined number of weeks of each of the plurality of promotional campaigns and a plurality of constraints,
   wherein one or more specified durations until an end of the specified upcoming time-frame comprises the specified duration for the scatter inventory utilization type, and
   wherein the plurality of constraints sets limit on allocation of a proportion of the inventory units to a selling title, a network, and off-channel networks;
   allocating, by the processor, based on the number of inventory units for each of the plurality of promotional campaigns, inventory units from a defined amount of inventory units among each inventory utilization type of the plurality of inventory utilization types to meet a plurality of defined parameters for the defined amount of inventory units for the one or more specified durations until the end of the specified upcoming time-frame; and
   distributing, by the processor, content via at least one channel based on the allocation of the inventory units from the defined amount of inventory units among each inventory utilization type of the plurality of inventory utilization types.

2. The method according to claim 1, further comprising determining, by the processor, reserve inventory units for each of the plurality of promotional campaigns that corresponds to the promotion inventory utilization type for the specified upcoming time-frame.

3. The method according to claim 1, further comprising acquiring, by the processor, historical viewership data of a first television show similar to that of a second television show that is to be promoted in at least one of absence of prior historical data, or for a defined number of weeks prior to a date of planning of the plurality of promotional campaigns for the specified upcoming time-frame for the determination of the number of inventory units required for one or more of the plurality of promotional campaigns.

4. The method according to claim 1, further comprising estimating, by the processor, the expected audience to view a plurality of television shows after launch date of the plurality of television shows that are promoted in the plurality of promotional campaigns, a baseline audience forecast, and the plurality of values for the promotion impact measure achieved with respect to the plurality of television shows,
    wherein the estimation of the expected audience, the baseline audience forecast and the plurality of values for the promotion impact measure is based on historical viewership data of television shows similar to that of the plurality of television shows to be promoted in absence of prior historical data, and
    wherein the estimation of the expected audience is further utilized for the determination of the number of the inventory units required for the plurality of promotional campaigns.

5. The method according to claim 1, further comprising scheduling, by the processor, a plurality of non-programming content items based on the inventory units among each inventory utilization type for the one or more specified durations to meet the plurality of defined parameters.

6. The method according to claim 1, wherein the plurality of defined parameters correspond to at least one of maximization of a rating parameter and a revenue parameter for the defined amount of inventory units and minimization of a total penalty from deviations of defined target values associated with the agreement information.

7. The method according to claim 1, further comprising generating, by the processor, a baseline audience forecast for at least one of a target or a demographics for one or more of the plurality of promotional campaigns.

8. The method according to claim 1, further comprising allocating, by the processor, the inventory units from the defined amount of inventory units among each inventory utilization type of the plurality of inventory utilization types based on an inventory planning for an upcoming time frame that is initiated at a defined duration prior to a start of the upcoming time frame.

9. A system, comprising:
    at least one processor in media management system that handles a plurality of agreement information for a plurality of promotional campaigns, the at least one processor configured to:
        generate a plurality of values associated with a promotion impact measure for each of the plurality of promotional campaigns based on historical data and a baseline audience forecast,
        wherein the plurality of promotional campaigns is planned for a specified upcoming time-frame, and
        wherein the historical data indicates an amount of inventory units utilized previously under a promotion inventory utilization type for the specified upcoming time-frame;
        determine a gross sum of the plurality of values associated with the promotion impact measure for each of the plurality of promotional campaigns for a defined number of weeks of each of the plurality of promotional campaigns;
        determine a number the inventory units for each of the plurality of promotional campaigns that corresponds to the promotion inventory utilization type of a plurality of inventory utilization types, based on a difference in an estimated demand value for the inventory units for a specified duration for a scatter inventory utilization type of the plurality of inventory utilization types and a current value of actual demand units for the scatter inventory utilization type for the specified duration and at least the gross sum of the plurality of values associated with the promotion impact measure for each of the plurality of promotional campaigns for the defined number of weeks of each of the plurality of promotional campaigns and a plurality of constraints,
        wherein one or more specified durations until an end of the specified upcoming time-frame comprises the specified duration for the scatter inventory utilization type, and
        wherein the plurality of constraints sets limit on allocation of a proportion of the inventory units to a selling title, a network, and off-channel networks;
        allocate, based on the number of inventory units for each of the plurality of promotional campaigns, inventory units from a defined amount of inventory units among each inventory utilization type of the plurality of inventory utilization types to meet a plurality of defined parameters for the defined amount of inventory units for the one or more specified durations until the end of the specified upcoming time-frame; and
        distribute content via at least one channel based on the allocation of the inventory units from the defined amount of inventory units among each inventory utilization type of the plurality of inventory utilization types.

10. The system according to claim 9, wherein the at least one processor is further configured to reserve inventory units for each of the plurality of promotional campaigns that corresponds to the promotion inventory utilization type for the specified upcoming time-frame.

11. The system according to claim 9, wherein the at least one processor is further configured to acquire historical viewership data of a first television show similar to that of a second television show that is to be promoted in at least one of absence of prior historical data, or for a defined number of weeks prior to a date of planning of the plurality of promotional campaigns for the specified upcoming time-frame for the determination of the number of the inventory units required for one or more of the plurality of promotional campaigns.

12. The system according to claim 9, wherein the at least one processor is further configured to estimate an expected audience to view a plurality of television shows after launch date of the plurality of television shows that are promoted in the plurality of promotional campaigns, the baseline audience forecast, and the plurality of values for the promotion impact measure achieved with respect to the plurality of television shows,
    wherein the estimation of the expected audience, the baseline audience forecast and the plurality of values for the promotion impact measure is based on historical viewership data of television shows similar to that of the plurality of television shows to be promoted in absence of prior historical data, and
    wherein the estimation of the expected audience is further utilized for the determination of the number of the inventory units required for the plurality of promotional campaigns.

13. The system according to claim 9, wherein the at least one processor is further configured to schedule a plurality of non-programming content items based on the inventory units among each inventory utilization type for the one or more specified durations to meet the plurality of defined parameters.

14. The system according to claim 9, wherein the plurality of defined corresponds to at least one of maximization a revenue parameter for the defined amount of inventory units and minimization of a total penalty from deviations of defined target values associated with the agreement information.

15. The system according to claim 9, wherein the at least one processor is further configured to generate the baseline audience forecast for at least one of a target or a demographics for one or more of the plurality of promotional campaigns.

16. A non-transitory computer-readable medium having stored thereon, computer-implemented instructions for causing at least one processor to execute operations, the operations comprising:
in a media management system that handles a plurality of agreement information for a plurality of promotional campaigns:
generating a plurality of values associated with a promotion impact measure for each of the plurality of promotional campaigns based on historical data and a baseline audience forecast,
wherein the plurality of promotional campaigns is planned for a specified upcoming time-frame, and
wherein the historical data indicates an amount of inventory units utilized previously under a promotion inventory utilization type for the specified upcoming time-frame;
determining a gross sum of the plurality of values associated with the promotion impact measure for each of the plurality of promotional campaigns for a defined number of weeks of each of the plurality of promotional campaigns;
determining a number of the inventory units for each of the plurality of promotional campaigns that corresponds to the promotion inventory utilization type of a plurality of inventory utilization types, based on a difference in an estimated demand value for the inventory units for a specified duration for a scatter inventory utilization type of the plurality of inventory utilization types and a current value of actual demand units for the scatter inventory utilization type for the specified duration and at least the gross sum of the plurality of values associated with the promotion impact measure for each of the plurality of promotional campaigns for the defined number of weeks of each of the plurality of promotional campaigns and a plurality of constraints,
wherein one or more specified durations until an end of the specified upcoming time-frame comprises the specified duration for the scatter inventory utilization type, and
wherein the plurality of constraints sets limit on allocation of a proportion of the inventory units to a selling title, a network, and off-channel networks;
allocating based on the number of inventory units for each of the plurality of promotional campaigns, inventory units from a defined amount of inventory units among each inventory utilization type of the plurality of inventory utilization types to meet a plurality of defined parameters for the defined amount of inventory units for the one or more specified durations until the end of the specified upcoming time-frame; and
distributing content via at least one channel based on the allocation of the inventory units from the defined amount of inventory units among each inventory utilization type of the plurality of inventory utilization types.

17. The non-transitory computer-readable medium according to claim 16, wherein the operations further comprise determining reserve inventory units for each of the plurality of promotional campaigns that corresponds to the promotion inventory utilization type for the specified upcoming time-frame.

18. The non-transitory computer-readable medium according to claim 16, wherein the operations further comprise acquiring historical viewership data of a first television show similar to that of a second television show that is to be promoted in at least one of absence of prior historical data, or for a defined number of weeks prior to a date of planning of the plurality of promotional campaigns for the specified upcoming time-frame for the determination of the number of inventory units required for one or more of the plurality of promotional campaigns.

19. The non-transitory computer-readable medium according to claim 16, wherein the operations further comprise estimating an expected audience to view a plurality of television shows after launch date of the plurality of television shows that are promoted in the plurality of promotional campaigns, the baseline audience forecast, and the plurality of values for the promotion impact measure achieved with respect to the plurality of television shows,
wherein the estimation of the expected audience, the baseline audience forecast and the plurality of values for the promotion impact measure is based on historical viewership data of television shows similar to that of the plurality of television shows to be promoted in absence of prior historical data, and
wherein the estimation of the expected audience is further utilized for the determination of the number of the inventory units required for the plurality of promotional campaigns.

20. The non-transitory computer-readable medium according to claim 16, wherein the operations further comprise scheduling a plurality of non-programming content items based on in accordance with the inventory units among each inventory utilization type for the one or more specified durations to meet the plurality of defined parameters.

* * * * *